US007378959B2

(12) United States Patent
Twitchell, Jr.

(10) Patent No.: US 7,378,959 B2
(45) Date of Patent: *May 27, 2008

(54) KEYHOLE COMMUNICATION DEVICE FOR TRACKING AND MONITORING SHIPPING CONTAINER AND CONTENTS THEREOF

(75) Inventor: Robert W. Twitchell, Jr., Cumming, GA (US)

(73) Assignee: Terahop Networks, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/832,998

(22) Filed: Aug. 2, 2007

(65) Prior Publication Data

US 2007/0273503 A1   Nov. 29, 2007

Related U.S. Application Data

(63) Continuation of application No. 11/306,764, filed on Jan. 10, 2006.

(60) Provisional application No. 60/766,233, filed on Jan. 3, 2006, provisional application No. 60/596,930, filed on Oct. 31, 2005, provisional application No. 60/719,061, filed on Sep. 21, 2005, provisional application No. 60/709,204, filed on Aug. 18, 2005, provisional application No. 60/696,159, filed on Jul. 1, 2005, provisional application No. 60/691,884, filed on Jun. 17, 2005, provisional application No. 60/691,718, filed on Jun. 17, 2005, provisional application No. 60/691,574, filed on Jun. 17, 2005, provisional application No. 60/687,415, filed on Jun. 3, 2005, provisional application No. 60/687,073, filed on Jun. 3, 2005, provisional application No. 60/642,632, filed on Jan. 10, 2005.

(51) Int. Cl.
*G08B 1/08* (2006.01)
*G08B 13/14* (2006.01)

(52) U.S. Cl. .............................. 340/539.13; 340/539.1; 340/539.16; 340/539.17; 340/572.1; 340/825.72; 340/10.1

(58) Field of Classification Search ............. 340/539.1, 340/539.13, 545.6, 568.1, 539.16, 505, 825.72, 340/572.1, 539.17, 10.1; 455/422.1, 499
See application file for complete search history.

(56) References Cited

U.S. PATENT DOCUMENTS 3,805,265 A * 4/1974 Lester ........................ 342/44
4,688,244 A * 8/1987 Hannon et al. ............... 377/58

(Continued)

*Primary Examiner*—George A Bugg
*Assistant Examiner*—Son M Tang
(74) *Attorney, Agent, or Firm*—Tillman Wright, PLLC; Chad D. Tillman; James D. Wright

(57) ABSTRACT

A shipping container that facilitates communications between wireless communication devices within the shipping container and an external network includes a keyhole communication device that is adapted for wireless communications with the external network and that includes first and second housing components. The first and second housing components together form an integrated housing structure that extends through a small opening in a wall of the shipping container, with the first housing component being disposed exterior to the shipping container and the second housing component being disposed interior to the shipping container. A first antenna is disposed within the first housing component for communications via a first communications protocol, such as a Bluetooth protocol. A second antenna also may be disposed within the first housing component for communications via a second communications protocol, such as a cellular communications protocol. The communications are controlled by electronic circuitry within the second housing component.

20 Claims, 14 Drawing Sheets

U.S. PATENT DOCUMENTS

| | | | |
|---|---|---|---|
| 4,750,197 A * | 6/1988 | Denekamp et al. | 455/404.2 |
| 5,565,858 A * | 10/1996 | Guthrie | 340/10.33 |
| 6,753,775 B2 * | 6/2004 | Auerbach et al. | 340/539.22 |
| 6,919,803 B2 * | 7/2005 | Breed | 340/539.14 |
| 6,927,688 B2 * | 8/2005 | Tice | 340/539.26 |
| 7,088,229 B2 * | 8/2006 | Johnson | 340/505 |
| 7,098,784 B2 * | 8/2006 | Easley et al. | 340/539.13 |
| 7,196,622 B2 * | 3/2007 | Lambright et al. | 340/539.26 |
| 2004/0119588 A1 * | 6/2004 | Marks | 340/539.1 |
| 2006/0114102 A1 * | 6/2006 | Chang et al. | 340/10.1 |

\* cited by examiner

KEYHOLE COMMUNICATION DEVICE FOR TRACKING AND MONITORING SHIPPING CONTAINER AND CONTENTS THEREOF

CROSS-REFERENCE TO RELATED APPLICATIONS

The present U.S. patent application ("U.S. patent application Ser. No.") is a continuation of, and claims the benefit under 35 U.S.C. § 120 to, Twitchell U.S. patent application Ser. No. 11/306,764 filed Jan. 10, 2006, which is a nonprovisional patent application of, and claims the benefit under 35 U.S.C. § 119(e) to, each of the following, each of which is expressly incorporated by reference herein:

(01) Twitchell U.S. patent application Ser. No. 60/596,930, titled "Determining Relative Elevation Using GPS and Ranging";

(02) Twitchell U.S. patent application Ser. No. 60/642,632, titled "Tracking and Monitoring Shipping Container and Content Thereof";

(03) Twitchell U.S. patent application Ser. No. 60/687,073, titled "Network Aided Terrestrial Triangulation Using Stars (NAATS)";

(04) Twitchell U.S. patent application Ser. No. 60/687,415, titled "Class-Based Soft Hand-Off in Wireless Communications";

(05) Twitchell U.S. patent application Ser. No. 60/691,574, titled "Event-Driven Mobile Hazmat Monitoring";

(06) Twitchell U.S. patent application Ser. No. 60/691,718, titled "Remote Sensor Interface (RSI) Having Power Conservative Transceiver for Transmitting and Receiving Signals";

(07) Twitchell U.S. patent application Ser. No. 60/691,884, titled "Remote Sensor Interface (RSI) Stepped Wake-Up Sequence";

(08) Twitchell U.S. patent application Ser. No. 60/696,159, titled "Nondeterministic and Deterministic Network Routing";

(09) Twitchell U.S. patent application Ser. No. 60/709,204, titled "Pipeline Monitoring"; and

(10) Twitchell U.S. patent application Ser. No. 60/719,061, titled "Pipeline Monitoring";

The present application further expressly incorporates by reference each of the following patent properties:

(01) Twitchell U.S. Pat. No. 6,745,027;
(02) Twitchell U.S. Pat. No. 6,934,540;
(03) Twitchell USPA Publication No. 2005/0093702;
(04) Twitchell USPA Publication No. 2005/0093703;
(05) Twitchell USPA Publication No. 2005/0215280;
(06) Twitchell Int'l Patent Application Publication No. WO 03/032501 A2;
(07) Twitchell Int'l Patent Application Publication No. WO 03/098851 A1;
(08) Twitchell U.S. patent application Ser. No. 11/161,539;
(09) Twitchell U.S. patent application Ser. No. 11/161,540;
(10) Twitchell U.S. patent application Ser. No. 11/161,542;
(11) Twitchell U.S. patent application Ser. No. 11/161,545;
(12) Twitchell U.S. patent application Ser. No. 11/161,550;
(13) Twitchell et al. U.S. patent application Ser. No. 60/688,737; and
(14) Twitchell et al. U.S. patent application Ser. No. 60/595,233.

Additionally, the present application expressly incorporates by reference: U.S. Pat. Nos. 6,753,775 B2; 6,665,585 B2; 5,458,042; U.S. Patent Application Publication No. 2004/0183673 A1; and U.S. Patent Application Publication No. 2004/0021572 A1.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to tracking and/or monitoring assets that are stored and/or transported in shipping containers and, in particular, to facilitating communications for tracking and/or monitoring assets that are stored and/or transported in shipping containers at a level of tracking and/or monitoring that is at or below that of the shipping container.

The ISO standard maritime and intermodal containers are ubiquitous and the primary means of shipping goods internationally to and from the United States. The container technology is a mature and well established practice with over 16 million containers worldwide. This in-place infrastructure represents billions of dollars in capital for shippers and terminal operators, most of which is designed to handle and transport the standardized ISO container.

In the last decade, and with increased emphasis following the passage of the Maritime Transportation Security Act, the Department of Homeland Security has devoted considerable resources toward securing maritime cargo. Indeed, container tracking and sensor monitoring have taken on added importance with the realization that a container shipped into the US could cause severe damage if a weapon of mass destruction (WMD) were to be smuggled therein. Programs that have been initiated include Operation Safe Commerce, the Container Security Initiative, C-TPAT, and the Smart Container initiative. The development continues with programs such as the Advanced Container Security Device and the Automated Commercial Environment. Unfortunately, all of these programs suffer from a lack of granularity in the level of tracking and monitoring provided. More specifically, none of the contemplated security and information systems are being designed to track or monitor a unit any smaller than today's ISO container. It is believed that a better system would include tracking and/or monitoring not only of such shipping containers as a whole, but the individual assets within such shipping containers as well.

Accordingly, in furtherance of the protection and security of international and national commerce, and in the interests of U.S. national security, one or more preferred embodiments of the present invention is intended to facilitate communications for tracking and/or monitoring of assets that are stored and/or transported within the ISO standard maritime and intermodal container, i.e., to provide visibility at a granularity below that of merely tracking or monitoring the shipping container itself. In this respect, one or more preferred embodiments of the present invention facilitates the tracking and/or the monitoring of not only the shipping container, but the contents within the container as well.

SUMMARY OF THE INVENTION

The present invention includes many aspects and features.

In an aspect of the invention, a shipping container is equipped to facilitate wireless communications between one or more wireless communication devices within the shipping container and a network that is external to the shipping container. The shipping container includes: a wall structure for receiving and containing items to be shipped; and a communication device, adapted for wireless communications with the external network, that includes a first housing component and a second housing component. The first housing component is disposed substantially exterior to the wall structure of the shipping container, and the second housing component is disposed substantially interior to the wall structure of the shipping container. Furthermore, the first and second housing components together form an integrated housing structure that extends through a small opening in the wall structure of the shipping container. Because the communication device physically extends through the small opening of the shipping container, it is sometimes referred to hereinbelow as a "keyhole" communication device.

Additionally, in accordance with this aspect of the invention, the keyhole communication device includes a first antenna disposed within the first housing component and first electronic circuitry disposed within the second housing and connected to the first antenna. The first electronic circuitry is adapted to control signal reception and transmission via the first antenna for communications with the external network and for communications with the wireless communication devices within the shipping container. Furthermore, the small opening in the wall structure of the shipping container preferably includes a diameter that is between about one-quarter to one full wavelength of the signals that are transmitted and received by the first antenna under the control of the first circuitry.

In a feature of this aspect, the first antenna comprises an antenna that is adapted for communications within the 2.4 GHz band such as, for example, an antenna adapted for Bluetooth or WiFi communications.

In another feature, the communication device further includes a GPS receiver disposed within the second housing component and a patch antenna for the GPS receiver disposed within the first housing component.

In other features of this aspect, the first electronic circuitry includes a tag turn on circuit (TTOC) for waking up a standards-based radio of the keyhole communication device; and the first electronic circuitry includes tag turn on (TTO) electronics for causing a tag turn on circuit (TTOC) of another communication device to wake up a standards-based radio of the other communication device.

In another feature, the first electronic circuitry is adapted for communication with one or more wireless tags (WTs), the WTs being associated with assets disposed within the interior of the shipping container.

In still yet another feature, the first electronic circuitry is configured to form, in conjunction with other communication devices, a class-based network, wherein at least some of the other communication devices are disposed exterior to the shipping container.

In another feature, the first electronic circuitry is configured to form, in conjunction with other communication devices, a class-based network, wherein at least some of the other communication devices being disposed within the interior of the shipping container.

In another feature, the shipping container further includes at least one sensor disposed about the shipping container, and the first electronic circuitry is communicatively interfaced with the at least one sensor for acquiring data therefrom. The interface may be via wireless communication or a direct wired connection.

In still yet another feature, the wall structure of the shipping container includes a static wall structure and at least one access door, and the keyhole communication device is disposed on the static wall structure and not on the at least one access door.

In another feature of this aspect, a second antenna is disposed within the second housing component and second electronic circuitry is connected to the second antenna that is adapted to control signal reception and transmission via the second antenna for additional communications with an external network and/or wireless communication devices within the area of the shipping container. With regard to this feature, the first electronic circuitry and the second electronic circuitry are disposed substantially within the second housing component. In a contemplated alternative, the first electronic circuitry and the second electronic circuitry are disposed substantially within the first housing component. In yet another contemplated alternative, the first electronic circuitry is disposed substantially within the first housing component and the second electronic circuitry is disposed substantially within the second housing component. With additional regard to this feature, the second antenna may comprise an antenna that is adapted, for example, for satellite communications or cellular communications. Alternatively, the first antenna comprises an antenna that is adapted, for example, for WiFi communications, WiMAX communications or UWB (Ultra Wide Band) communications.

In another aspect of the invention, a shipping container equipped for external communications via a wireless network includes: a wall structure for receiving and containing items to be shipped; and a keyhole communication device, adapted for wireless external communication, that includes a first housing component and a second housing component. The first housing component contains a first antenna and a second antenna therein and the second housing component contains an electronics assembly for controlling receptions and transmissions of the first antenna and the second antenna. Additionally, the first housing component is mounted on an exterior portion of the wall structure and is disposed substantially exterior to the shipping container, and the second housing component is mounted on an interior portion of the wall structure, proximate the first housing component, and is disposed substantially interior to the shipping container. Furthermore, the first antenna is adapted for wireless communication external to the shipping container and the second antenna is adapted for wireless communication internal to the shipping container.

In still yet another aspect of the invention, a shipping container equipped to facilitate internal and external wireless communications includes: a wall structure for receiving and containing items to be shipped; and a wireless keyhole communication device that includes a first housing component and a second housing component. The first housing component is disposed substantially exterior to the walls of the shipping container, and the second housing component is disposed substantially interior to the walls of the shipping container. The first and second housing components together form an integrated housing structure that extends through an opening in the wall structure of the shipping container. Furthermore, the keyhole communication device includes an antenna disposed within the first housing component and electronic circuitry connected to the antenna that is adapted to facilitate signal transmission via the antenna. Moreover, the opening in the wall of the shipping container includes a diameter of between one-quarter and one full wavelength, inclusive, of the electromagnetic waves used to wirelessly communicate via the antenna, whereby internal and external wireless communications via the antenna are thereby facilitated.

In still yet another aspect of the invention, a network includes a plurality of wireless keyhole communication devices of shipping containers of one or more of the aforementioned aspects. Additionally, the network may comprise a common designation network, such as a class-based network.

In yet another aspect of the invention, a method of facilitating wireless communications between one or more wireless communication devices within a shipping container and a network that is external to the shipping container includes the steps of: disposing a wireless keyhole communication device on a shipping container such that a first housing component of the keyhole communication device is disposed on the exterior of the shipping container and a second housing component of the keyhole communication device is disposed within the interior of the shipping container, wherein the first and second housing components together form an integrated housing structure that extends through an opening of the shipping container, wherein the keyhole communication device is adapted for wireless communications with one or more wireless communication devices disposed within the interior of the shipping container, and wherein the keyhole communication device is adapted for wireless communications with a network that is external to the shipping container; wirelessly communicating between the keyhole communication device disposed on the shipping container and the one or more wireless communication devices disposed within the interior of the shipping container; and wirelessly communicating between the keyhole communication device disposed on the shipping container and the network that is external to the shipping container.

In features of this aspect, the keyhole communication device disposed on the shipping container is disposed on a wall of the shipping container, and the integrated housing structure extends through an opening in the wall of the shipping container.

In another feature of this aspect, the method further includes the step of disposing a sealing ring on the wall of the shipping container for sealing of the opening in the wall of the shipping container through which the integrated housing structure extends.

In yet another a feature of this aspect, the opening in the wall of the shipping container includes a diameter of between one-quarter and one full wavelength, inclusive, of the electromagnetic waves used to wirelessly communicate between the keyhole communication device disposed on the shipping container and the one or more wireless communication devices disposed within the interior of the shipping container.

In a feature of this aspect, the frequency of the wirelessly communications between the keyhole communication device disposed on the shipping container and the one or more wireless communication devices disposed within the interior of the shipping container is within the 2.4 GHz band.

In other, alternative features of this aspect, the wall comprises a side wall of the shipping container; a top wall of the shipping container; a bottom wall of the shipping container; and a wall of an access door of the shipping container. Preferably, the wall comprises a side wall, which configuration is believed to afford greater protection for the housing of the keyhole communication device than the other contemplated locations on the shipping container.

In still yet another aspect of the invention, a shipping container that facilitates wireless communications between one or more wireless communication devices within an interior thereof and a network that is external thereto includes a wireless keyhole communication device that is disposed on the shipping container such that a first housing component of the keyhole communication device is disposed on the exterior of the shipping container and a second housing component of the keyhole communication device is disposed within the interior of the shipping container.

In accordance with this aspect, the first and second housing components together form an integrated housing structure that extends through an opening of the shipping container; the keyhole communication device is adapted for wireless communications with one or more wireless communication devices disposed within the interior of the shipping container; and the keyhole communication device is adapted for wireless communications with a network that is external to the shipping container.

In a feature of this aspect, the first housing component of the keyhole communication device disposed on the shipping container includes an antenna for communications with the network that is external to the shipping container. The antenna may comprises an antenna adapted for remote communications including, for example, satellite, WiMAX, UWB, or cellular communications.

In another feature of this aspect, the first housing component of the keyhole communication device disposed on the shipping container includes a GPS receiver, and the first housing component of the keyhole communication device disposed on the shipping container includes a patch antenna disposed in electronic communication with the GPS receiver.

In a feature of this aspect, the first housing component of the keyhole communication device disposed on the shipping container includes an antenna for communications with the one or more wireless communication devices disposed within the interior of the shipping container.

In another feature of this aspect, at least one of the wireless communication devices disposed within the interior of the shipping container comprises a remote sensor interface (RSI). With regard to this feature, the RSI may be disposed in electronic communication with at least one sensor and is adapted to communicatively interface with the at least one sensor via wireless communication or via a direct wired connection. The sensor may comprises, for example, a temperature sensor, a motion sensor, a humidity sensor, a radiation sensor, a video camera, a still camera, an electronic seal sensor, and/or a microphone.

In another feature of this aspect, at least one of the wireless communication devices disposed within the interior of the shipping container comprises a wireless tag reader (WT reader). With regard to this feature, assets disposed within the interior of the shipping container may include radiofrequency identification tags (RFID tags or "WTs") associated therewith, and a remote sensor interface (RSI) may comprise a WT reader.

In a feature of this aspect, the keyhole communication device disposed on the shipping container comprises a WT reader and the one or more wireless communication devices disposed within the interior of the shipping container comprise one or more WTs associated with assets within the shipping container.

In a feature of this aspect, the keyhole communication device disposed on the shipping container is disposed, itself, in electronic communication with at least one sensor.

In a feature of this aspect, the network exterior to the shipping container comprises wireless communication devices, each of which is disposed on a respective shipping container.

In other features of this aspect, the network exterior to the shipping container comprises a wide area network (WAN) that includes Internet communications, cellular communications, and/or satellite communications.

In still yet another feature of this aspect, the first and second housing components are separately formed but are adapted to be secured together. In this regard, the first and second housing components may include correspondingly-threaded fittings adapted to be screwed together. Furthermore, the electronics assembly may include first electrical contacts disposed in the first housing component and second electrical contacts disposed in the second housing component, wherein the first and second electrical contacts are electrically connected to one another when the first housing component is secured to the second housing component.

In still yet another feature of this aspect, the first and second housing components are integrally formed.

In yet another feature of this aspect, the first and second housing components are formed from a material that does not significantly impede transmission of RF energy.

In still yet another feature of this aspect, the first and second housing components have external configurations adapted to conform to respective surface contours of the shipping container.

In another feature of this aspect, the shipping container comprises an ISO intermodal shipping container.

Another aspect of the invention relates to a communication device for attaching to a shipping container. The communication device includes an electronics assembly, including an antenna, for wireless communication; a first housing component, containing the antenna, that is adapted to be mounted on an exterior wall of a shipping container such that the first housing component is disposed substantially exterior to the shipping container and substantially surrounds an opening in the wall of the shipping container; and a second housing component adapted to be mounted on an interior wall of the shipping container, proximate the first housing component, such that the second housing is disposed substantially interior to the shipping container and substantially surrounds the opening in the wall of the shipping container.

In a feature of this aspect, the first housing component defines a first hollow interior, wherein the second housing component defines a second hollow interior, and wherein the first hollow interior is contiguous with the second hollow interior via the opening in the wall of the shipping container.

In another aspect of the invention, a communication device for attaching to a shipping container includes: an electronics assembly, including first and second antennas and circuitry connecting the first and second antennas together, for wireless communication; a first housing component, containing the first and second antennas, that is adapted to be mounted on an exterior wall of a shipping container such that the first housing component is disposed substantially exterior to the shipping container; and a second housing component, containing the electronic circuitry for controlling transmissions and receptions by the first and the second antennas, that is adapted to be mounted on an interior wall of the shipping container, proximate the first housing component, such that the second housing is disposed substantially interior to the shipping container.

In a feature of this aspect, the first antenna is adapted for wireless communication external to the shipping container and the second antenna is adapted for wireless communication internal to the shipping container.

In still yet another aspect of the invention, a method of attaching a communication device to a shipping container includes the steps of: providing a communication device, adapted for wireless external communication, that includes a first housing component and a second housing component, the first housing containing an antenna; positioning the first housing component exterior to the shipping container; positioning the second housing component interior to the shipping container; and securing the first housing component and the second housing component together through the shipping container.

In a feature of this aspect, the step of positioning the first housing component includes positioning the first housing component such that an external configuration thereof conforms to an external surface configuration of the wall of the shipping container, and the step of positioning the second housing component includes positioning the second housing component such that an external configuration thereof conforms to an internal surface configuration of the wall of the shipping container such that the first and second housing components are protected within recesses of the shipping container.

In another feature of this aspect, the method further includes the preliminary step of forming an opening in the wall of the shipping container through which the first and second housing components are secured together. With regard to this feature, the step of forming the opening in the wall of the shipping container may include forming the opening with a diameter of between one-quarter and one full wavelength, inclusive, of radiofrequency waves used to communicate within a 2.4 GHz band.

In an aspect of the invention, a method of attaching a communication device to a shipping container includes steps of: providing a communication device, adapted for wireless external communication, that includes a first housing component and a second housing component, the first housing containing an antenna; mounting the first housing component on an exterior wall of a shipping container such that the first housing component is disposed substantially exterior to the shipping container and substantially surrounds an opening in the wall of the container; and mounting the second housing component on an interior wall of the shipping container, proximate the first housing component, such that the second housing component is disposed substantially interior to the shipping container and substantially surrounds the opening in the wall of the shipping container.

In a feature of this aspect, the step of mounting the first housing component includes mounting the first housing component such that the first housing component defines a first hollow interior, wherein the step of mounting the second housing component includes mounting the second housing component such that the second housing component defines a second hollow interior and such that the first hollow interior is contiguous with the second hollow interior via the opening in the wall of the shipping container.

Another aspect of the invention includes a method of attaching a communication device to a shipping container. The method includes the steps of: providing a communication device, adapted for wireless external communication, that includes a first housing component and a second housing component, the first housing containing a first antenna and a second antenna; mounting the first housing component on an exterior wall of the shipping container such that the first housing component is disposed substantially exterior to the shipping container; and mounting the second housing component on an interior wall of the shipping container, proximate the first housing component, such that the second housing component is disposed substantially interior to the shipping container. The second housing component includes circuitry for controlling transmissions and receptions of the first antenna and the second antenna.

In a feature of this aspect, the method further includes the steps of: communicating wirelessly, via the first antenna, with communication devices external to the shipping container; and communicating wirelessly, via the second antenna, with communication devices internal to the shipping container.

Another aspect of the invention includes a method for tracking and/or monitoring contents of an ISO intermodal shipping container. The method includes the steps of: wirelessly communicating, by a keyhole communication device attached to the shipping container, via a first antenna that is disposed within a first housing component of the communication device, with one or more communication devices within the interior of the shipping container; and wirelessly communicating, by the keyhole communication device attached to the shipping container, with a network external to the shipping container, the wireless communications including information relating to the tracking and/or the monitoring of the contents of the shipping container. In accordance with this aspect, the first and second housing components are secured together through a wall of the shipping container, with the first housing component residing substantially within the interior of the shipping container and with the second housing component residing substantially exterior to the shipping container. The wireless communications are controlled by circuitry within the second housing component of the keyhole communication device.

In a feature of this aspect, the keyhole communications device communicates to the external network via a second antenna that is disposed within the first housing component of the keyhole communication device.

In a feature of this aspect, each communication device is associated with one or more respective contents of the shipping container, and the information relates, respectively, to the respective tracking and/or the monitoring of the contents of the shipping container.

In a feature of this aspect, the method also includes the step of sending a message to the keyhole communication device attached to the shipping container that results in the keyhole communication device sending a message to the communication devices within the interior of the shipping container. The message that is sent to the communication devices within the interior of the shipping container further may result in at least one of the communication devices sending a message to the keyhole communication device and, further, the sending, in response thereto, of a message from the keyhole communication device to the external network.

In addition to the aforementioned aspects and features of the invention, it should be noted that the invention further includes the various possible combinations of such aspects and features, including the combinations of such aspects and features with those aspects and features of the incorporated references from which priority is claimed.

BRIEF DESCRIPTION OF THE DRAWINGS

One or more preferred embodiments of the invention now will be described in detail with reference to the accompanying drawings, which are for the purpose of illustrating one or more preferred embodiments of the invention and are not intended to be to scale, and wherein.

DETAILED DESCRIPTION

Figure 1:
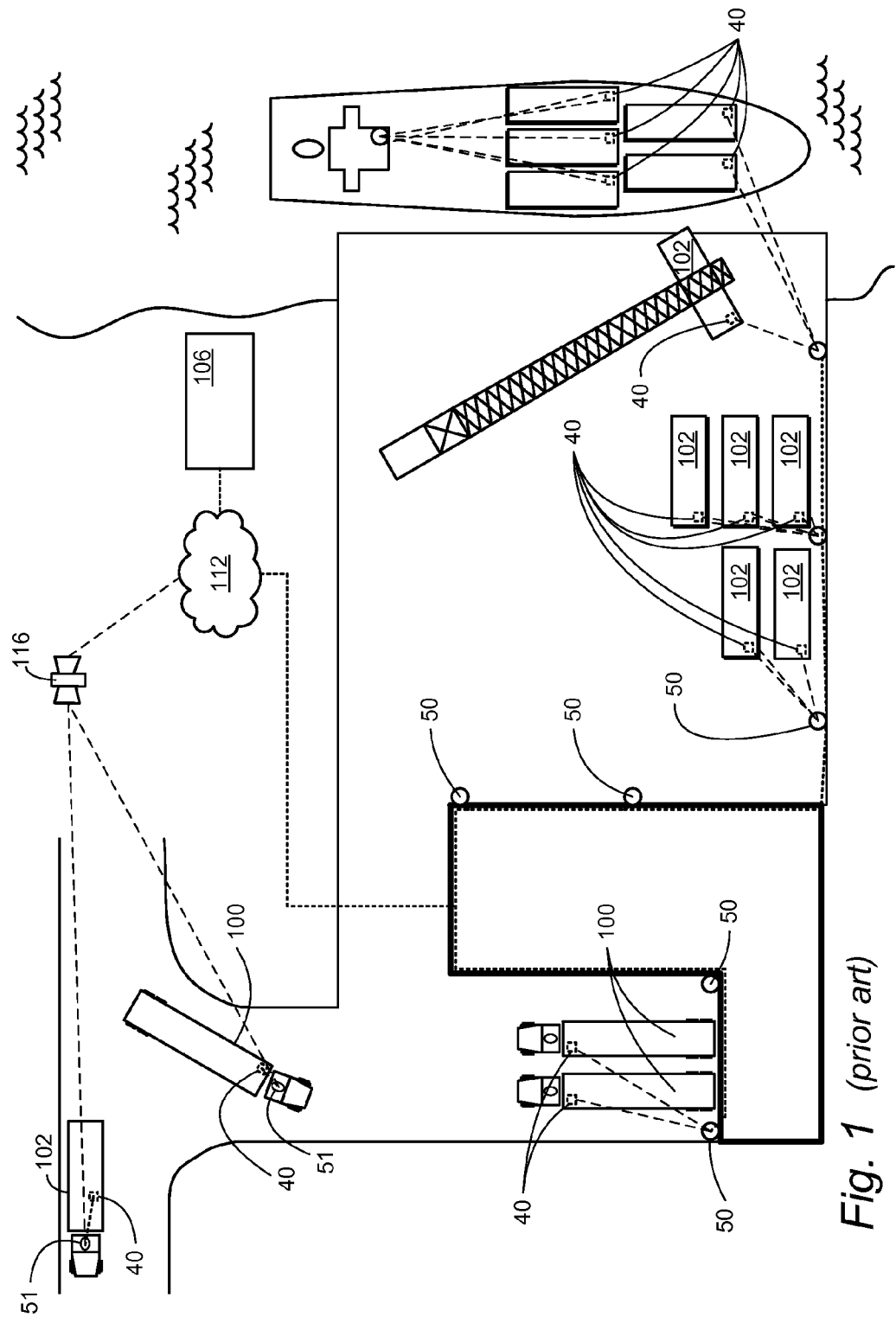
FIG. 1 is an illustration of a shipping port in which a conventional asset monitoring and/or tracking system is utilized.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term-differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, preferred embodiments of the present invention are next described. The following description of preferred embodiment(s) is merely exemplary in nature and is in no way intended to limit the invention, its application, or uses.

Figure 2:
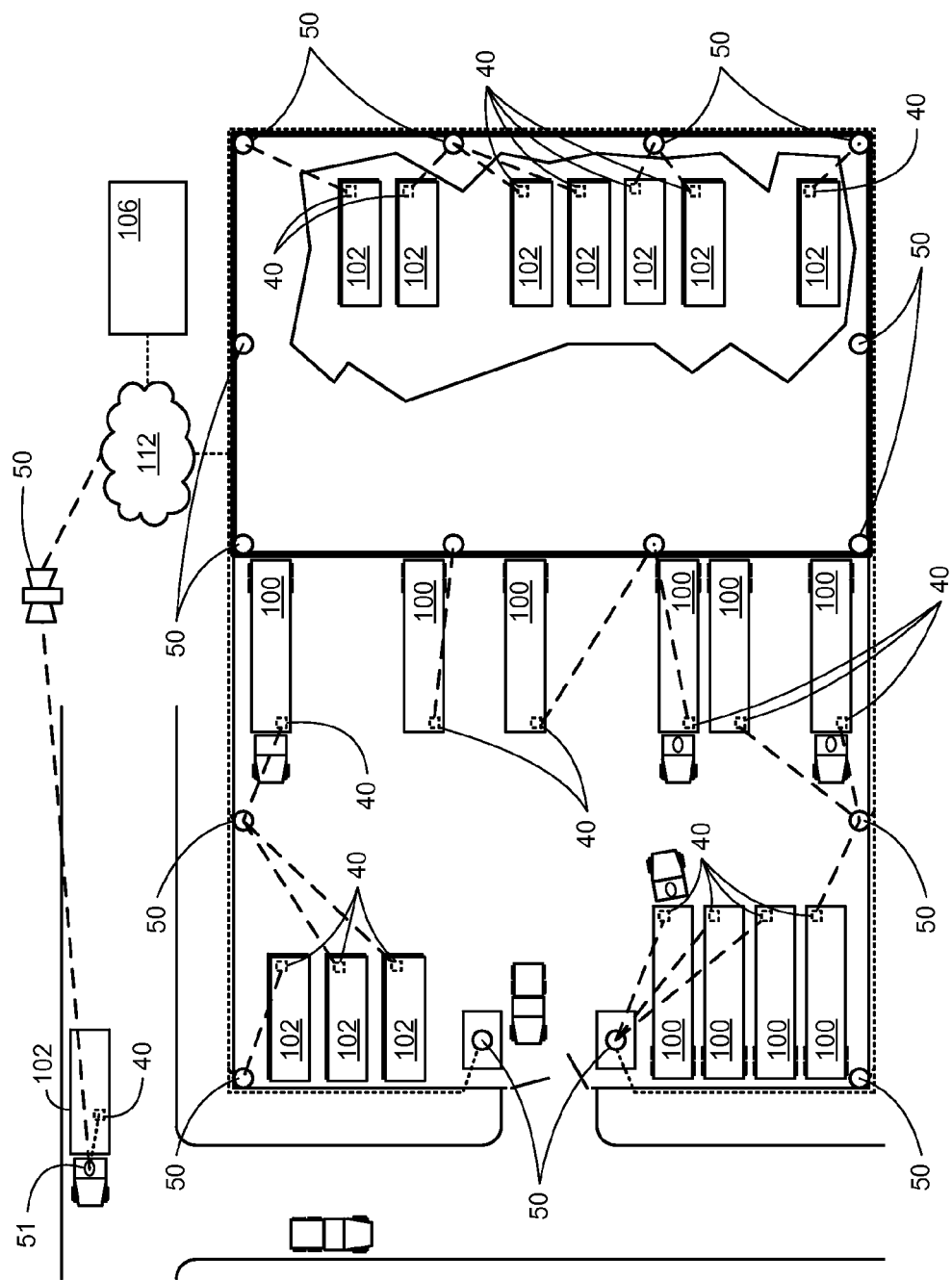
FIG. 2 is an illustration of a warehouse in which a conventional asset monitoring and/or tracking system is utilized.

FIG. 1 is an illustration of a shipping port in which a conventional asset monitoring and/or tracking system is utilized, and FIG. 2 is an illustration of a warehouse in which a conventional asset monitoring and/or tracking system is utilized. Both the shipping port and warehouse illustrations include the use of shipping containers 102, such as, for example, ISO standard maritime and intermodal containers. In many such environments, highway-only trailers 100 also are utilized.

The conventional asset monitoring and/or tracking systems of FIGS. 1 and 2 each utilizes wireless tag readers 40, located within the highway trailers 100 and shipping containers 102, for reading wireless tags and/or for receiving sensor acquired data from sensors within or associated with the highway trailers 100 and shipping containers 102 in accordance with the disclosures of U.S. Pat. No. 6,745,027 B2, International Patent Application Publication No. WO 03/032501 A2 (designating the United States and published in English), and International Patent Application Publication No. WO 03/098851 A1 (designating the United States and published in English), each of which has been incorporated herein by reference. As used herein, the term "wireless tag" ("WT") refers to a wireless transceiver that is associated with an asset to be tracked. WTs can be, for example, passive, active, or semi-passive, but preferably each WT is a semi-passive transceiver. Also as used herein, the term "wireless tag reader" ("WT reader") refers to a wireless transceiver that generally is used to read WTs. WT readers can be, for example, passive, active, or semi-passive, but preferably each WT reader is an active transceiver. As illustrated in FIGS. 1 and 2, highway trailers 100 and shipping containers 102 and the contents thereof may be tracked using WTs, sensors, WT readers and the principles described in the above-mentioned patent references.

In particular, as described in these patent references, gateways 50 (sometimes referred to as "gateway controllers" or "GC") are mounted in spaced relation to each other and connected together to a server-based application 106 via a wide area network (WAN) 112, which may include, for example, the Internet. The gateways 50 are used to wirelessly communicate with and obtain information from the WT readers 40 according to principles well disclosed in the references. The wireless communications preferably comprise radiofrequency communications whose transmissions are within the 2.4 GHz band, such as Bluetooth communications or WiFi communications.

Additionally, mobile gateways 51 are illustrated on the trucks pulling the containers 102 and trailers 100 and include satellite communications, whereby communications may be passed through the mobile gateways 51 between the WT readers 40 and the server-based application 106, even during transportation of the shipping containers 102 and highway trailers 100 in remote areas. As shown, the mobile gateways 51 are mounted on the cabs of the trucks and preferably are powered by the electrical systems of the trucks for communications with the WT readers 40 via, for example, Bluetooth communications, as well as for communication with the WAN 112 via satellite communications. The mobile gateways 51 further may include cellular communication capabilities, WiFi capabilities, UWB (Ultra Wide Band) capabilities and/or WiMAX capabilities in addition to, or in substitution for, the satellite communication capabilities for communications with the WAN 112.

A drawback to the systems shown in FIGS. 1 and 2 is that communications with WT readers 40 disposed within the trailers 100 and shipping containers 102, both by the gateways 50 and the mobile gateways 51, can be degraded due to the construction materials of the walls of the trailers 100 and shipping containers 102, which often are made of steel or an alloy thereof. Such materials reduce the range and effectiveness of radiofrequency communication, which is the preferred mode of communication with the WT readers 40. This problem furthermore is aggravated when maritime shipping containers 102 are stacked during storage and transportation. Although less of an issue, a similar problem exists when conventional highway trailers 100 are closely parked together in trucking depots or warehouse environments. Accordingly, in addressing this problem and as used herein, the term "shipping container" is intended to refer broadly to both the standard ISO maritime shipping containers as well as highway-only trailers and the like.

Within the context of the shipping containers 100, 102 illustrated in FIGS. 1 and 2, the present invention improves communications between internal and external communication devices in order to provide improved visibility of assets within the shipping containers 100, 102. In this respect, various keyhole communication devices 500 are provided that improve communications between the interior and exterior of the shipping containers, even when the shipping containers are stacked during storage and transportation or closely parked beside each other. In this context, the keyhole communication devices 500 of the present invention are described in detail below and with reference to the various drawings.

Figure 3:
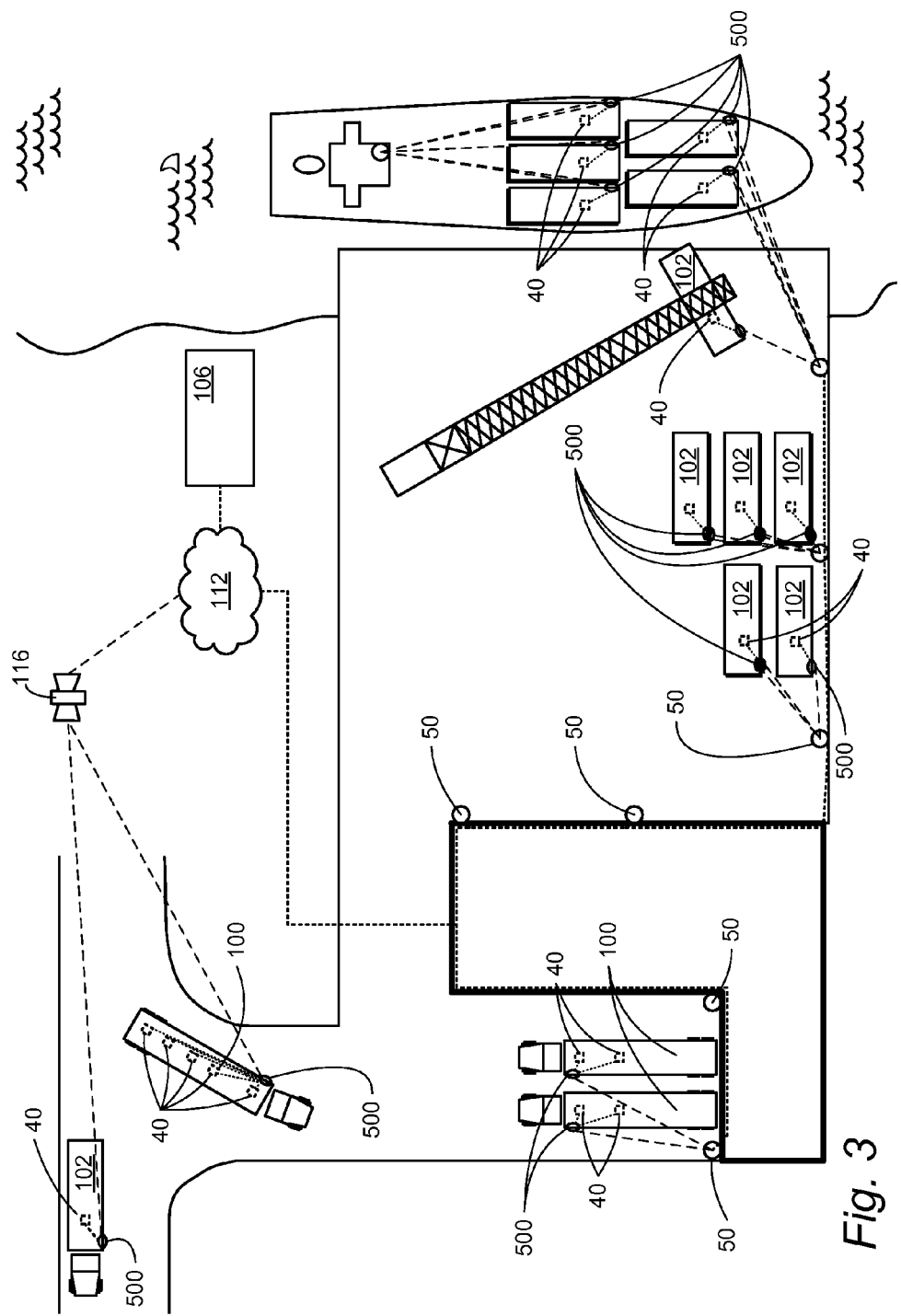
FIG. 3 is an illustration of a shipping port in which an asset monitoring and/or tracking system is utilized that has shipping containers with keyhole communication devices attached thereto in accordance with the preferred embodiments of the present invention.
Figure 4:
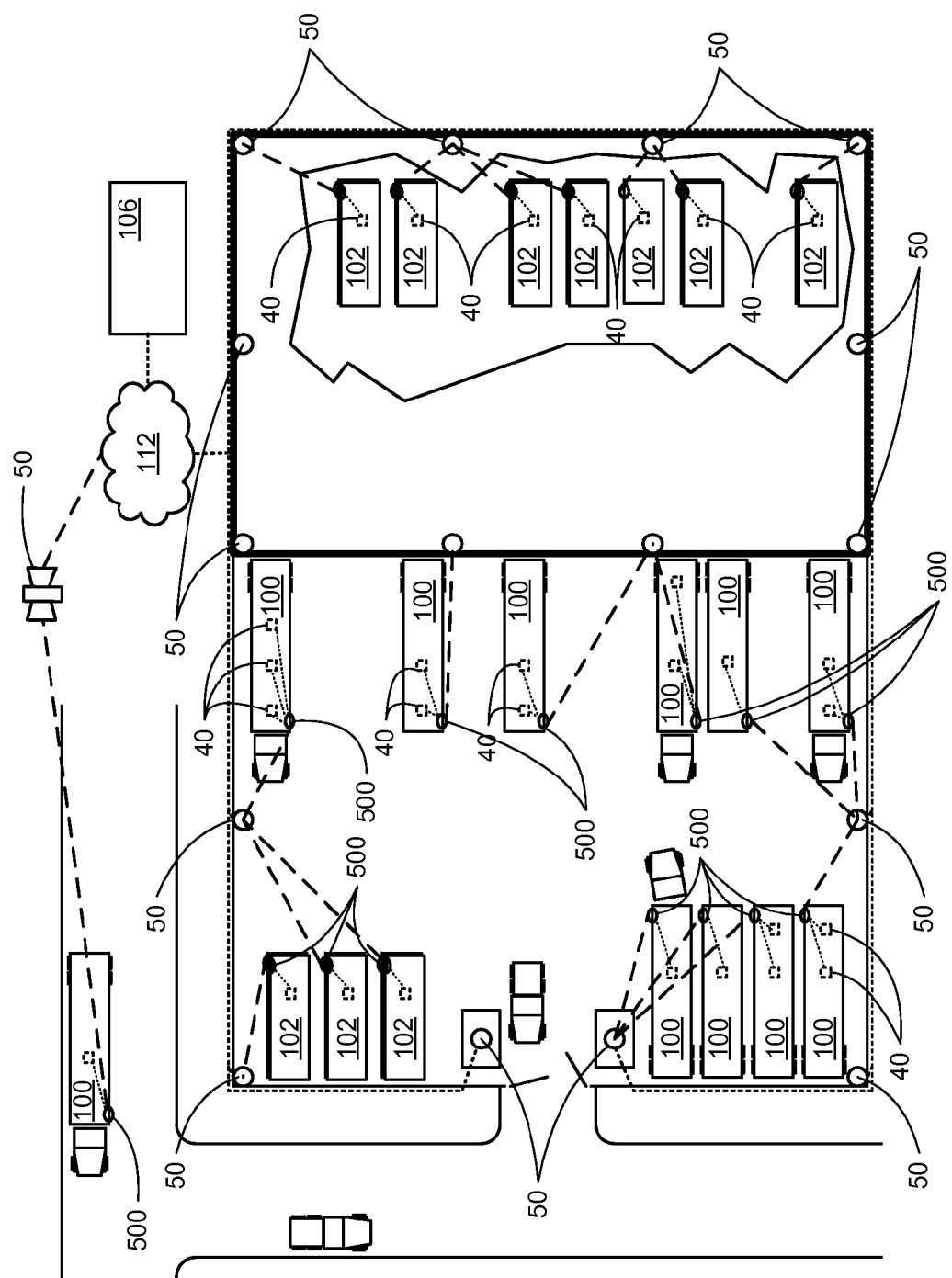
FIG. 4 is an illustration of a warehouse in which an asset monitoring and/or tracking system is utilized that has shipping containers with keyhole communication devices attached thereto in accordance with the preferred embodiments of the present invention.

Accordingly, FIG. 3 generally illustrates a shipping port in which an asset monitoring and/or tracking system is utilized that has shipping containers with keyhole communication devices attached thereto in accordance with a preferred embodiment of the present invention, and FIG. 4 generally illustrates a warehouse in which an asset monitoring and/or tracking system is utilized that has shipping containers with keyhole communication devices attached thereto in accordance with a preferred embodiment of the present invention. It will be appreciated from comparison of FIGS. 1 and 2 with FIGS. 3 and 4 that the keyhole communication devices of the invention communicate not only with the satellite 116 in the manner of the mobile gateways 51 of FIGS. 1 and 2, but also with the stationary gateways 50 in the manner of the WT readers 40 of FIGS. 1 and 2. In this regard, the keyhole communication devices 500 of the preferred embodiments of FIGS. 3 and 4 communicate both with the WT readers (not shown) disposed within the interior of the shipping containers 100, 102 and with various external communication devices, including, for example, the satellite 116 and the stationary gateways 50. The keyhole communication device 500 of each shipping container 100, 102 thus serves as a liaison between internal and external communications.

Furthermore, as discussed in greater detail below, the keyhole communication device 500 itself may receive, process, and transmit messages intended for and authored by the keyhole communication device 500 or, alternatively, the keyhole communication device 500 may simply function as a repeater and pass communications to and from the interior of the shipping container, repeating each message as it is received. Still yet, the keyhole communication device 500 may include operational modes. In the first mode, the keyhole communication device 500 may receive, process, and transmit messages intended for and authored by the keyhole communication device 500, and in the second mode, the keyhole communication device 500 may simply function as a repeater and pass communications to and from the interior of the shipping container, repeating each message as it is received. The mode of operation also may be remotely selected. For instance, if the keyhole communication device 500 includes class-based (or common designation based) wake-up features as disclosed in some of the incorporated references, then the mode of operation may be dependent upon the common designation that is used to wake-up the keyhole communication device 500.

Figure 5A:
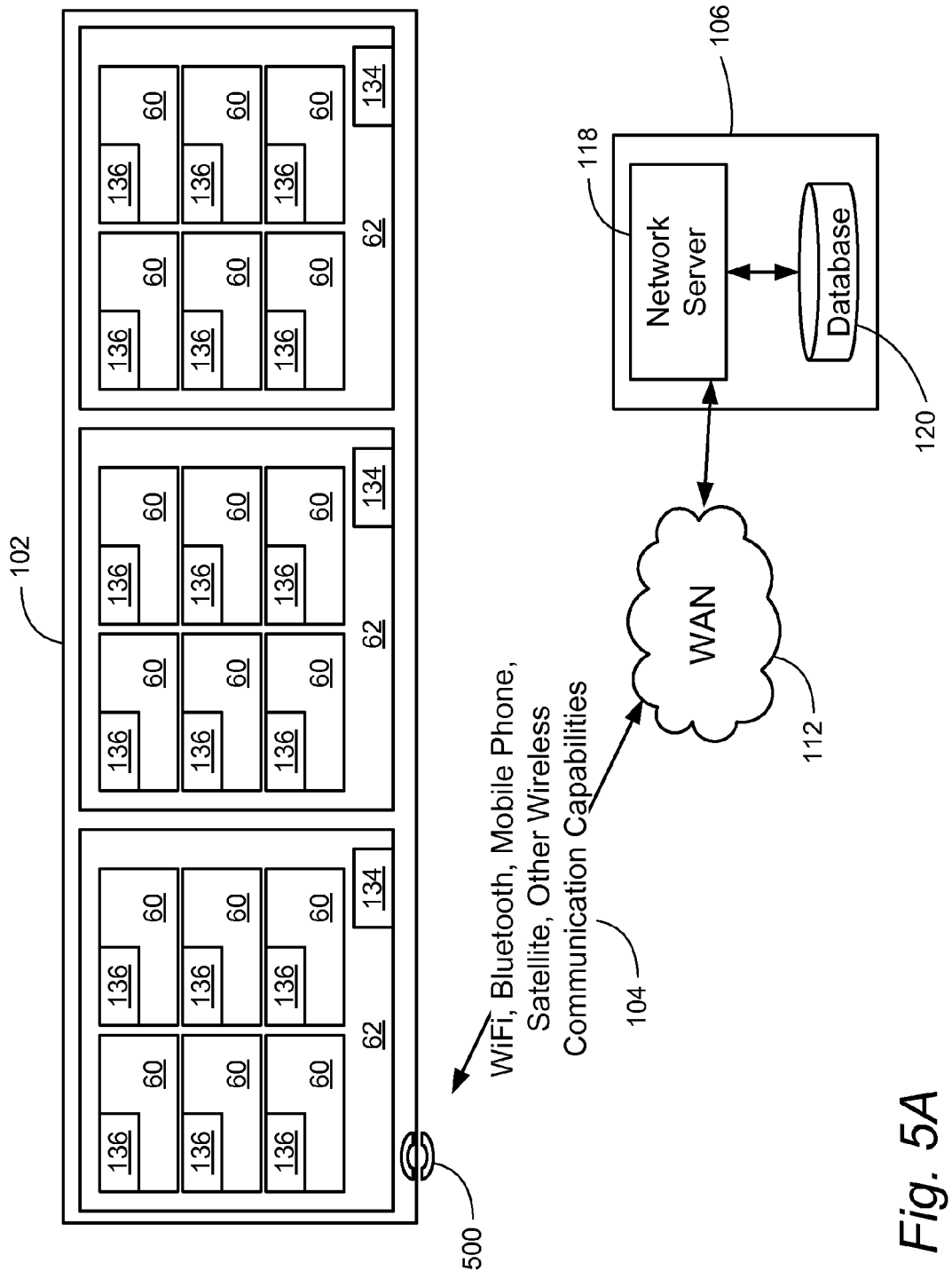
FIG. 5A is a block diagram illustrating an implementation of the network-connected keyhole communication device attached to an ISO shipping container in accordance with the present invention.

The shipping containers 100, 102 of FIGS. 3 and 4 are now described with respect to the exemplary shipping container 102 of FIG. 5A. In this respect, FIG. 5A illustrates an implementation of a network-connected keyhole communication device 500 attached to an exemplary ISO maritime shipping container 102 in accordance with an embodiment of the present invention.

As more fully described herein below, the keyhole communication device 500 is mounted on a part of the wall structure of the container 102 with one portion being disposed within the interior of the container 102 and another portion being disposed outside of the container 102. Furthermore, while the keyhole communication device 500 may be mounted on any suitable portion of the wall structure, including a door, the ceiling, the floor, and any side wall, it is frequently advantageous to mount the keyhole communication device 500 at a relatively high elevation on one of the side walls of the container 102. The higher location helps minimize interference during the above-described communications with the WAN 112. In addition, it has been found that electronics devices are often subjected to excessive jarring, shaking and bumping when mounted on access doors due to the additional movement caused by opening and closing of the doors and, thus, it is preferred that the keyhole communication device 500 be mounted on a more stable structure, such as on one of the side walls, in order to avoid any unnecessary jarring, shaking and bumping. Furthermore, the side wall is preferred to the ceiling and floor, as it is believed that the keyhole communication device 500 would be less susceptible to damage if attached to the side wall. Indeed, the housing components of the keyhole communication device 500 preferably conform to and fit within the ribbed/corrugated-shaped recesses of the side walls for added protection of the keyhole communication device 500.

The keyhole communication device 500 as illustrated is disposed in at least intermittent electronic communication with the WAN 112 by way of any of a wide variety of technologies, including but not limited to WiFi, Bluetooth, mobile phone, satellite, and the like, or a combination thereof. In particular, the keyhole communication devices 500 communicate with gateways that provide access to the WAN 112. In the exemplary systems of FIGS. 3 and 4, the communication devices 500 communicate with stationary gateways 50 and mobile gateways 51. For example, the mobile gateways 51 communicate with a satellite 116. The satellite 116 is, in turn, connected via the WAN 112 to the server-based tracking and/or monitoring application 106, which is generally embodied by a network server 118 and an associated database system 120, but other topologies will be apparent to the Ordinary Artisan. Similarly, the stationary gateways 50 preferably include a centralized broadband connection to the Internet and WAN 112 for communicating with the server-based tracking and/or monitoring application 106. Such a tracking and/or monitoring application 106 is more fully disclosed in the aforementioned incorporated references and is not further described herein.

Various communication protocols may be utilized in the communications by the keyhole communication devices 500 with the various gateways. Moreover, different keyhole communication devices 500 may have different capabilities for communications. In this regard, one keyhole communication device 500 may include only Bluetooth or WiFi capabilities for communicating with a gateway, while another keyhole communication device 500 may include cellular or satellite capabilities for communicating with a gateway.

Figure 5B:
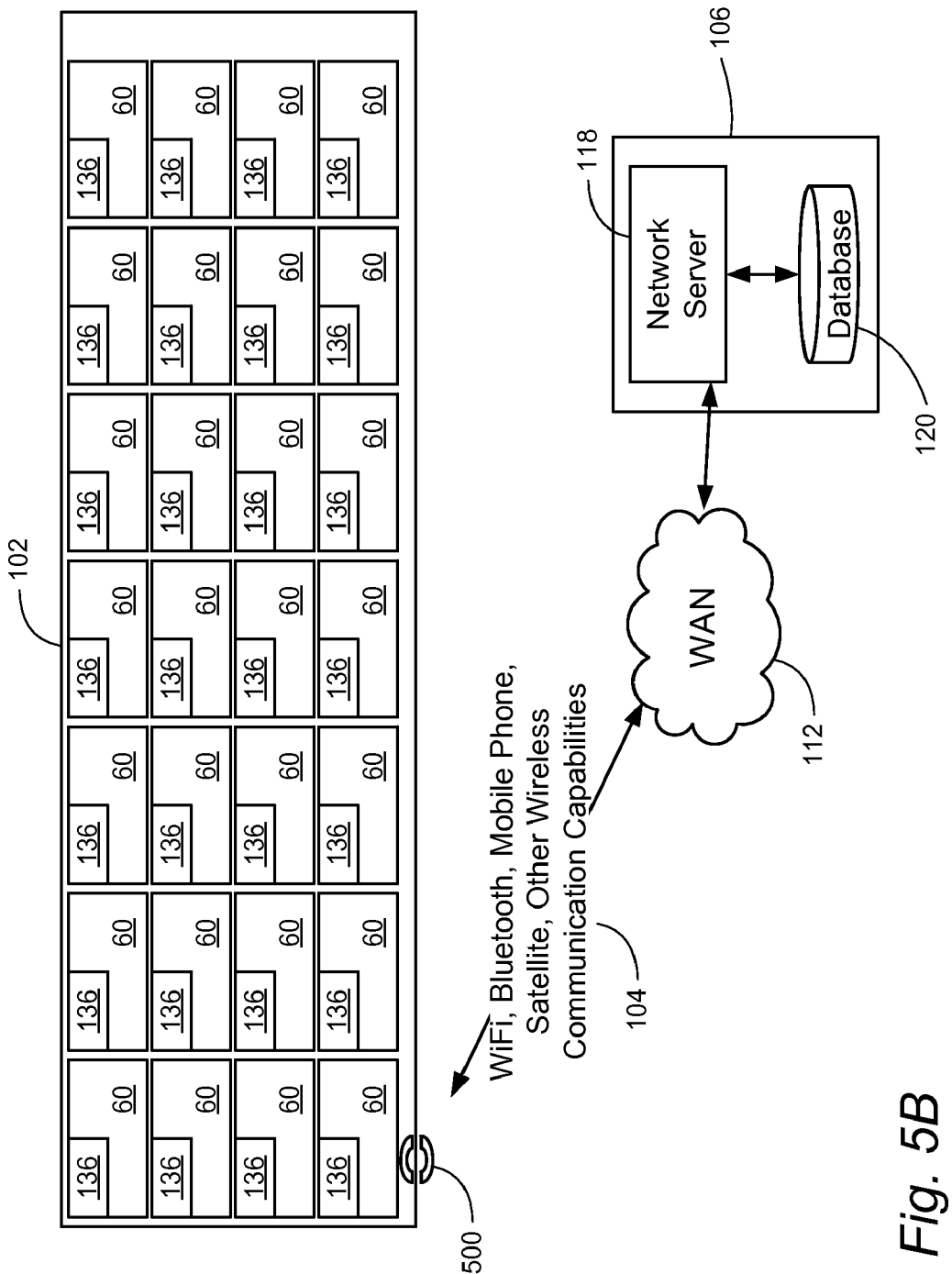
FIG. 5B is a block diagram illustrating an alternative implementation of the network-connected keyhole communication device attached to an ISO shipping container in accordance with the present invention.

In any event, the keyhole communication device 500 comprises a two-way communication device that preferably communicates not only with gateways, but also communicates with additional communication devices 134 disposed within the interior of the shipping containers 102. In an exemplary scenario, illustrated in FIG. 5A, the additional communication devices 134 comprise, for example, WT readers, each of which may further communicate with WTs 136 that are associated with assets or items 60 that are being shipped within the container. Alternatively, however, the keyhole communication device 500 may communicate directly with the WTs 136, as shown in FIG. 5B, provided that the keyhole communication device includes the capabilities required for reading the WTs. The communication devices 134 may be packaged within the packaging of the respective items 60, integrated into pallets of the respective items 60, integrated into the packaging, integrated or disposed within the items 60 themselves, or integrated with the items 60 in any other matter as desired. The communication devices 134 located in the shipping container 102 also preferably form ad hoc class-based networks as disclosed in U.S. Pat. No. 6,745,027 B2; International Patent Application Publication No. WO 03/032501 A2 (designating the United States and published in English); and International Patent Application Publication No. WO 03/098851 A1 (designating the United States and published in English), each of which is incorporated herein by reference. In this regard, it should be appreciated that the keyhole communication device 500 of the present invention may represent a gateway itself to the communication devices 134 within the shipping container 102, in accordance with these incorporated patent references.

In this respect, the keyhole communication device 500 facilitates communication between the communication devices 134 located within the shipping container 102 and the server-based application 106 that is located remotely from the shipping container 102. Specifically, data is communicated from the communication devices 134 to the keyhole communication device 500, and the data, and/or data indicative thereof, is further communicated from the keyhole communication device 500 via a gateway 50,51 over the WAN 112 to the server 118, whereat the communicated data preferably is stored in the database system 120. The data communication between the communication devices 134 and the keyhole communication device 500, and between the keyhole communication device 500 and a gateway 50,51, is accomplished in accordance with a standardized communications protocol, including Bluetooth and WiFi communication protocols. Furthermore, the data may be communicated upon a triggering event and/or in response to inquiries sent from the server 118, as desired. The data also may be transmitted at regularly scheduled intervals, as desired.

Figure 6:
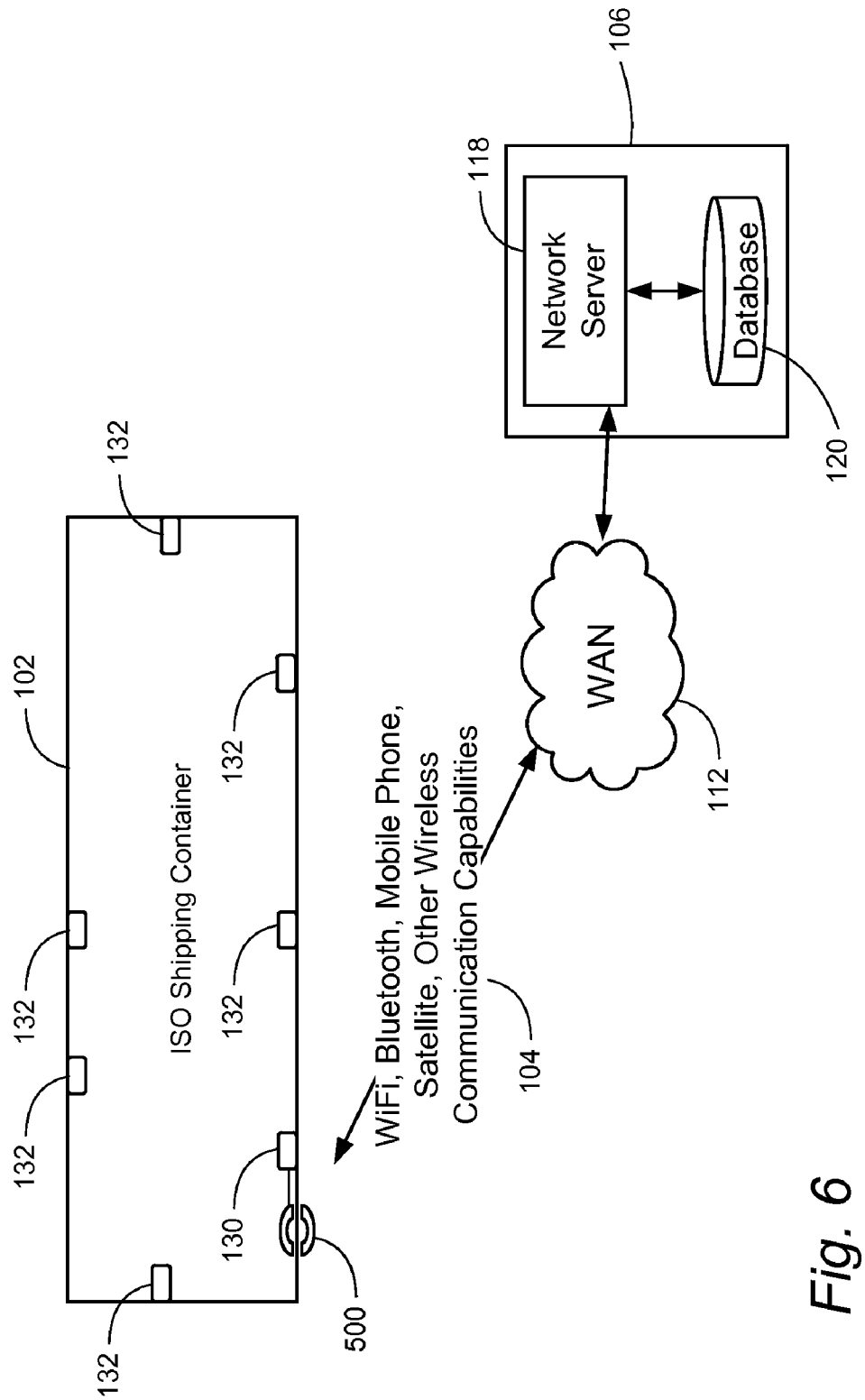
FIG. 6 is a block diagram illustrating another implementation of the network-connected keyhole communication device attached to an ISO shipping container in accordance with the present invention.

FIG. 6 is a block diagram illustrating another implementation of a network-connected keyhole communication device 500 in an exemplary maritime shipping container 102 in accordance with another preferred embodiment of the present invention. This keyhole communication device 500 is implemented in generally similar fashion to the keyhole communication device 500 described with regard to FIG. 5A. More particularly, the keyhole communication device 500 is mounted on a wall of the container 102 with one portion inside the container 102 and another portion outside the container 102. The keyhole communication device 500 is at least intermittently in communication with the WAN 112, which may utilize any of a wide variety of technologies, including but not limited to WiFi, Bluetooth, mobile phone, satellite, and the like, or a combination thereof. The WAN 112 is, in turn, connected to the tracking application 106 which is generally embodied by the network server 118 and the associated database system 120 shown in FIG. 6.

In this implementation, however, the keyhole communication device 500 comprises a two-way communication device that is capable of communication with other nearby wired or wireless devices 130, 132. As illustrated in FIG. 6, several such nearby devices 130, 132 may be distributed throughout the shipping container 102 or located nearby the shipping container (not shown). In this implementation, each device 130, 132 comprises a sensor with which the communication device 500 is interfaced. Alternatively, each device 130, 132 may comprise a remote sensor interface ("RSI") with which the keyhole communication device 500 wirelessly communicates, with the RSIs being interfaced with the sensors. The sensors may include, but are not limited to, temperature sensors, motion sensors, humidity sensors, radiation sensors, video cameras, still cameras, microphones, electronic/magnetic seal sensors, and the like, whereby conditions, characteristics, etc. regarding the shipping container and/or the contents thereof may be monitored and/or tracked. If provided, communications between the RSIs and the keyhole communication device preferably are carried out in accordance with a standardized communications protocol, including Bluetooth and WiFi communication protocols.

Indeed, as used herein, the term "sensor" is intended to relate broadly to many types of devices that are each in some way sensitive to the security, integrity, configuration, condition, disposition, orientation, location, contents, or surroundings of a container 102. Thus, a sensor can be a seal monitor that detects openings and closures of a container 102. A sensor can be an inclination monitor for detecting the overturning or tipping of a container 102 that should be maintained in a particular orientation. A sensor can be a device or array of devices for measuring state conditions of a container 102 or that of its contents such as temperature, volume, weight or mass, and pressure. A sensor can be any activity-monitoring or reconnaissance device such as a camera, a microphone, a motion detector, a light detector, and a broad-band RF signal scanner. A sensor can be a device for detecting physical presence, asset movement, and tampering such as a pressure-sensitive pad on a floor or surface, a switch on an access-panel, and an optical device such as an infra-red beam device, or an on-board accelerometer. A sensor also can be a device that detects any hazardous material, such as those that represent chemical, biological, radiological, nuclear, and explosive (CBRNE) threats. Such a sensor thus could be used to detect weapons of mass destruction within the shipping container 102.

The devices 130, 132 communicate, via the keyhole communication device 500, with the server-based application 106 that is remotely located to the shipping container 102. In this respect, the keyhole communication device 500 facilitates communication between the communication devices 130, 132 located within the shipping container 102 and the server-based application 106 that is located remotely from the shipping container 102. Specifically, data-including data acquired from the sensors of the shipping container 102 and/or data indicative of the sensor readings from the sensors in the shipping container 102—is communicated from the communication devices 130, 132 to the keyhole communication device 500, and the data, and/or data indicative thereof, is further communicated from the keyhole communication device 500 via a gateway 50,51 over the WAN 112 to the server 118, whereat the communicated data preferably is stored in the database system 120. The data communication between the devices 130, 132 and the keyhole communication device 500, and between the keyhole communication device 500 and a gateway 50,51, preferably is accomplished in accordance with a standardized communications protocol, including Bluetooth and WiFi communication protocols. Furthermore, the data may be communicated upon a triggering event and/or in response to inquiries sent from the server 118, as desired. The data also may be transmitted at regularly scheduled intervals, as desired.

Furthermore, as will be appreciated from the incorporated references, the implementations of FIGS. 5 and 6 may be combined, wherein the keyhole communication device 500 acquires and communicates data from communication devices 134 and from devices 130,132. Additionally, a communication device 134 itself may include or be disposed in electronic communication with one or more sensors, such as those described with regard to FIG. 6, and sensor acquired data may be obtained from the communication device 134.

Figure 7:
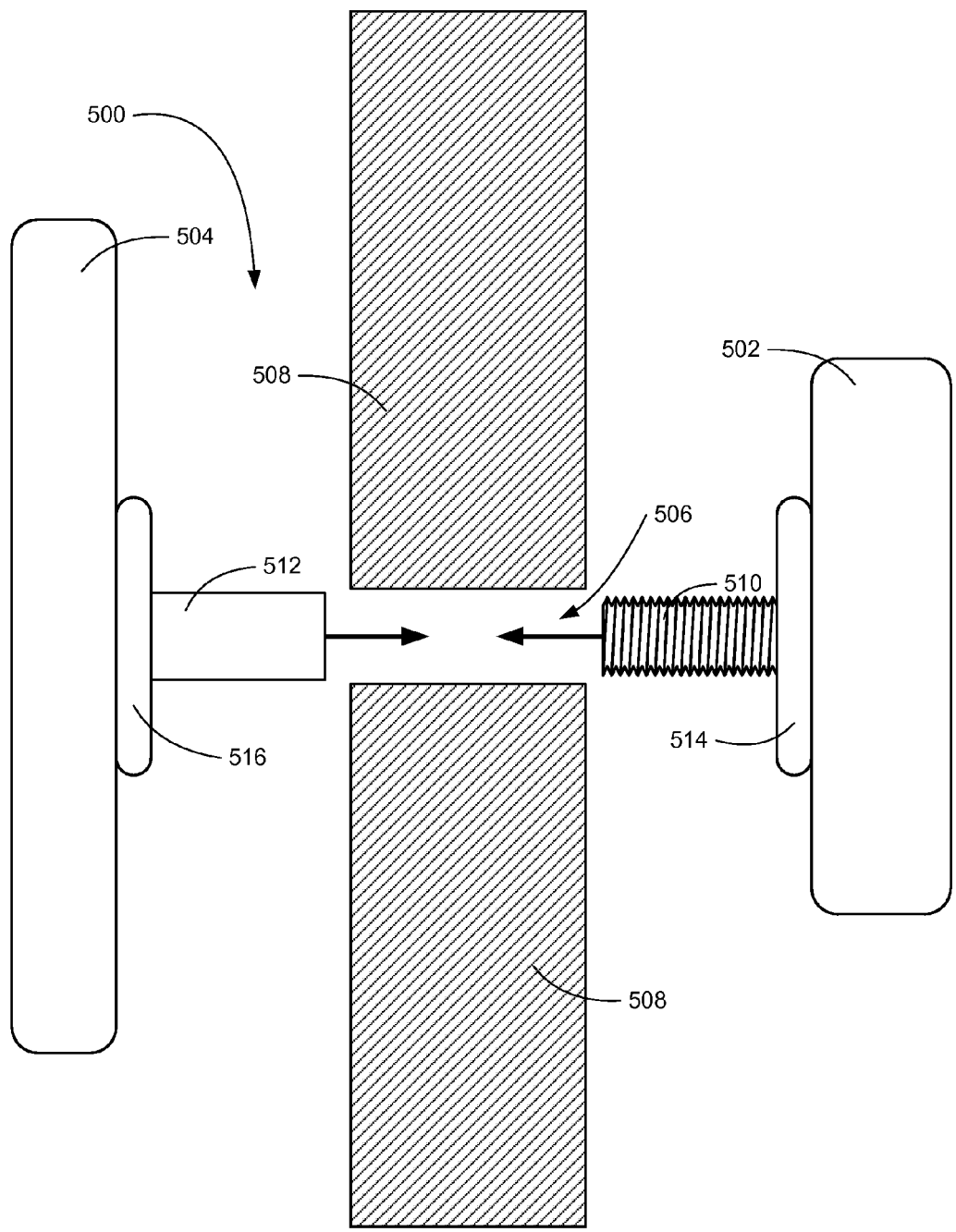
FIGS. 7 and 8 are side cross-sectional views of a keyhole communication device for attaching to a shipping container in accordance with a preferred embodiment of the present invention.
Figure 8:
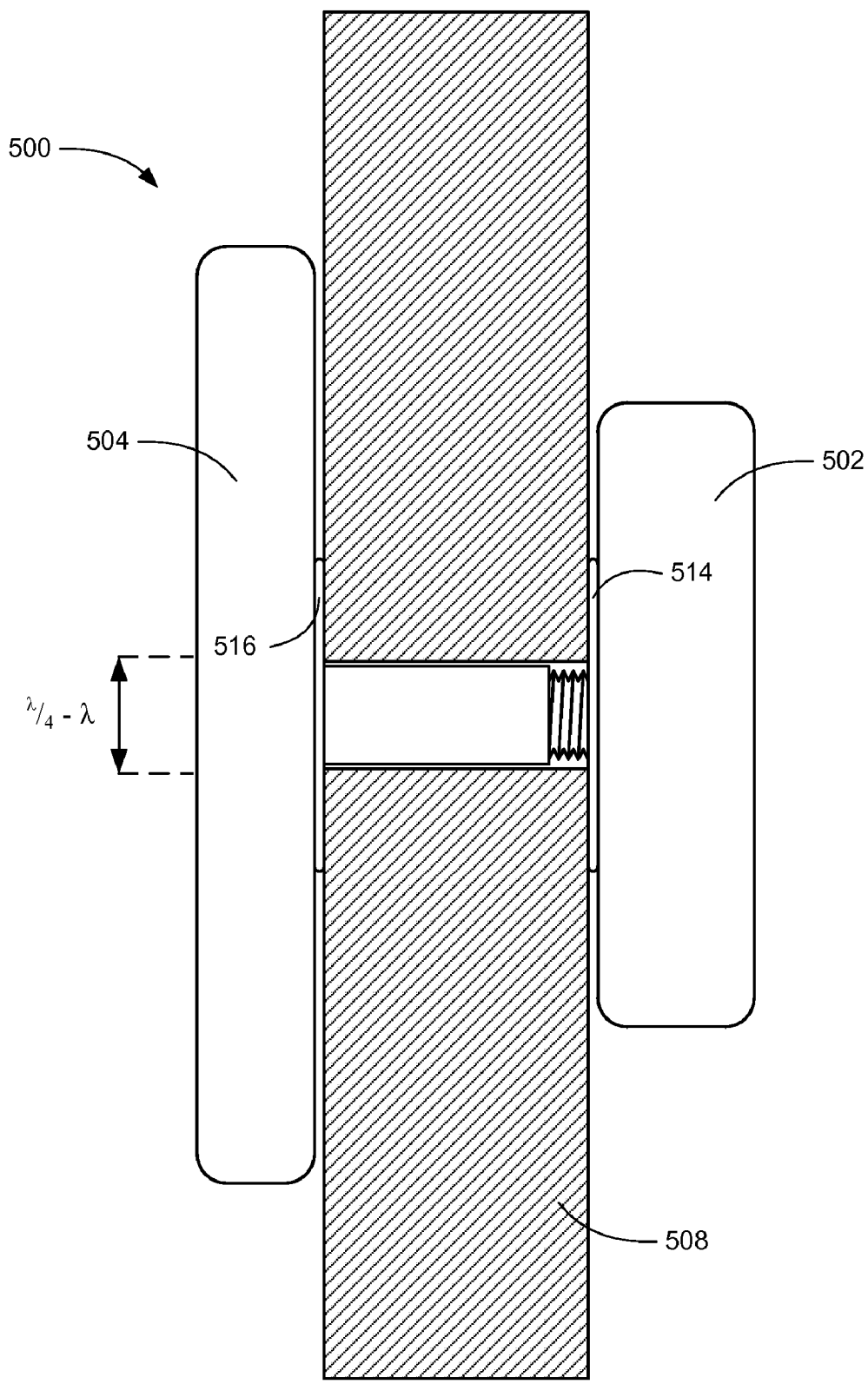

FIGS. 7 and 8 illustrate side cross-sectional views of a keyhole communication device 500 in accordance with a preferred embodiment of the invention, wherein the keyhole communication device 500 is installed on a wall 508 of an exemplary shipping containers 102. As shown therein, the keyhole communication device 500 includes an internal component 502 and an external component 504. In the illustrated embodiment, the internal component 502 removably engages the external component 504 through a screw-type connection by rotationally inserting, through an opening 506 in the wall 508 of the shipping container 102, a threaded male fitting 510 of the internal component 502 into a correspondingly-threaded female fitting 512 of the external component 504. The internal and external components 502, 504 are thereby secured together on the wall 508 of the shipping container 102. FIG. 7 illustrates the two components 502, 504 prior to their engagement, and FIG. 8 illustrates the two components 502, 504 secured together on the wall 508 of the shipping container 102.

It should be noted that any conventional manner of securing the internal and external components 502, 504 together that result in the external component 504 residing on the exterior of the shipping container 102 and the internal component 502 residing on the interior of the shipping container 102 may be utilized in connection with the present invention, and the screw-type connection is shown only as one possible manner of achieving such a connection in order to provide an enabling disclosure of the present invention. Other manners of securing the components together may include latching, snapping, adhering the two components 502, 504 or their equivalents.

As will be appreciated, it often is desirable to maintain the integrity of the environment within the shipping container 102, especially with regard to interior temperature and humidity. In order to maintain the integrity of the interior of the shipping container 102, sealing rings 514, 516, formed from a resilient material such as rubber, are preferably provided between each of the two components 502, 504 and the shipping container wall 508 about the opening 506. The sealing rings 514, 516 seal the opening 506 in the wall 508 of the shipping container 102 and at least reduce the amount of, if not eliminate, the moisture that otherwise may pass through the opening 506 in the shipping container wall 508. The sealing rings 514, 516 may further be made of an insulating material to reduce the flow of heat through the opening 506 in the shipping container wall 508 between the interior and exterior of the shipping container 102. Furthermore, one of the sealing rings 514, 516 may be omitted if only a single seal is deemed necessary or desirable in preserving the interior environment of the shipping container 102.

Each component 502, 504 of a keyhole communication device 500 preferably is made from a radio-frequency (RF) friendly material, i.e., a material that does not significantly impede transmission of RF energy.

In a variation of a keyhole communication device (not shown), the first and second components are integral with each other and do not constitute separate components. In this regard, an exterior section and an interior section (not shown) may be integrally formed together in a molding process out of one or more RF-friendly materials. Additionally, the opening 506 in a shipping container wall 508 is preferably large enough to accommodate the passing there through of the equivalent of at least one of the sections (i.e., one or both ends of a structure similar to that of the combined components 502, 504 as shown in their assembled state in FIG. 8) for securing the keyhole communication device to the shipping container wall 508. The particular portion that is passed through the opening 506 may include resilient elements to facilitate the insertion of that portion through the opening 506 and, additionally, to provide resistance to removal of that portion from the opening 506.

In accordance with the present invention, the keyhole communication device 500 includes an electronics assembly that is housed in one or both of the internal and external components 502, 504. The design and implementation of the electronics assembly depends upon the functionality desired in the keyhole communication device 500. Indeed, many different variations exist in accordance with embodiments of the present invention. Furthermore, In those keyhole communication devices 500 in which the electronics assembly is distributed between both the internal and external components 502, 504, then the internal and external components 502, 504 preferably further include electrical contacts (not shown) that connect when the components 502, 504 are secured together. These electrical contacts provide a data communications link between electronics located in each of the two components 502, 504 of the keyhole communication device 500 as well as power and ground connections between the two components 502, 504.

The components of the electronics assembly that are disposed within the external component 504 (i.e., the component of the keyhole communication device 500 that is located exterior to the cargo area of the shipping container 102) preferably include an antenna or antennas for wireless communications with a gateway. Depending on the wireless communication protocol used by a particular gateway, the electronics assembly housed in the exterior component 504 may include, for example, an antenna for satellite communications; an antenna for cellular communications; an antenna for WiFi communications; an antenna for WiMAX communications; an antenna for UWB communications; and/or an antenna for Bluetooth communications. Conversely, the components of the electronics assembly housed within the interior component 502 (i.e., the component of the keyhole communication device 500 that is located proximate or within the interior of the cargo area of the shipping container 102) preferably include circuitry for sending and receiving transmissions via the one or more antennas housed within the external component 504.

In this regard, it is believed to optimal to minimize the size of the exterior component 504 in order to reduce the likelihood of damage to the exterior component 504 when, for example, the shipping containers 102 are stacked during transport and storage. Accordingly, while it nevertheless is preferred to include antennas within the exterior component 504 for increased range of communication with a gateway, it is still preferred to include the associated circuitry for such antennas within the interior component 502. For this same reason, the internal power source for the electronics assembly of the keyhole communication device 500 also is preferably located within the interior component 502.

With particular regard to communications by the keyhole communication device 500 with devices within the shipping container 102 (i.e., with respect to "internal communications"), the antenna for internal communications preferably is disposed within the external component 504, and the associated circuitry for controlling such communications preferably is disposed within the internal component 502. Moreover, to the extent that the communications protocol with the gateway 50 is the same as the communications protocol for the internal communications, the antenna and associated electronic circuitry that used for the gateway communications is further used for the internal communications.

As a result of the preferred location of the antennas within the exterior component 504 of the keyhole communication device 500, it further will be appreciated that one or more of the antennas and associated circuitry may be utilized to establish communications with communications devices, in addition to gateways 50, that are exterior to but within the general vicinity of the shipping container 102. Such additional communications with exterior devices may comprise, for example, the establishing of an ad hoc class based network with keyhole communication devices 500 attached to neighboring shipping containers 102. In this regard, each keyhole communication device 500 may itself comprise a node in such a network, as such network nodes are described in U.S. Pat. No. 6,745,027. Furthermore, as disclosed therein, classes and sub-classes may be established that are internal to a particular shipping container 102, external to a particular shipping container 102, or that include nodes both inside the shipping container 102 and outside the shipping container 102.

Furthermore, such additional communications by the keyhole communication device 500 could comprise, for example, a communications path by which a neighboring keyhole communication device, that otherwise is not equipped to communicate with available gateways 50, or is having difficulties in carrying out such communications for any of a variety of reasons, nevertheless may communicate to the server-based application 106 via the keyhole communication device 500 through one of the available gateways 50. Indeed, in such circumstances, and in order to facilitate relatively wide area communications between such keyhole communication devices 500, each keyhole communication device 500 may include, for example, a WiMAX radio (not shown) for intercommunications between keyhole communication devices 500. In this regard, the exterior component 504 preferably includes therein the antenna for such WiMAX intercommunications, with the associated circuitry again being disposed within the interior 502. In such an arrangement, communications may be relayed or "hopped" from one keyhole communication device 500 to another until a gateway 50 or other WAN access point is reached.

The opening 506 in which the keyhole communication device 500 is secured may be created when the shipping container 102 is manufactured, or alternatively, a conventional shipping container 102 may be retrofitted with a keyhole communication device 500 in accordance with the present invention, preferably by forming an opening in a wall 508 of the conventional shipping container 102. Retrofitting shipping containers 102 is especially beneficial in view of the large number of existing shipping containers 102 in use in commerce today.

Importantly, the opening 506 that is formed in the wall 508 of the shipping container 102 preferably includes a diameter of at least one-quarter wavelength, and more preferably a diameter of one full wavelength, of the radio waves that are used to communicate through the opening 506 of the container wall 508 with communication devices within the shipping container 102. In preferred implementations of the present invention, a frequency within the 2.4 Gigahertz ("GHz") band is utilized for internal communications and, consequently, the diameter of the opening 506 in the wall 508 of the shipping container 102 preferably includes a diameter of at least 3, and preferably 13 centimeters ("cm"). Of course, the reception improves as the diameter of the opening 506 is increased; however, container integrity is a very significant consideration, and minimizing the size of the hole 506 is an important factor in preserving the integrity of the container 102 and, thus, a preferred diameter range of between 3 and 13 cm, inclusive, is specified herein when the 2.4 GHz band is utilized for such communication. The provision of an opening 506 having such a diameter maintains a high degree of container integrity while at the same time facilitates communications in and out of the shipping container 102 when the antenna that is used for the internal communications is disposed within the exterior component 504 of the keyhole communications device 500. Positioning of this antenna within the exterior component 504 further enables greater range for communicating with communication devices exterior to the shipping container 102 without loss of communication coverage into and out of the shipping container 102. Nonetheless, it will be apparent that still-larger diameters may be preferred for applications where improved communication reliability, greater range, or the like, is desired or necessary. Moreover, it will be apparent that diameters larger than 3-13 cm may be necessary or desirable for communication taking place at lower frequencies, and that smaller diameters may be sufficient for communications taking place at higher frequencies.

FIGS. 9A-9D are block diagrams of several alternative arrangements of the elements of the electronics assembly in a keyhole communication device 500, illustrating the relative disposition of the elements therein. A first alternative electronics assembly 550, shown in FIG. 9A, includes an antenna 552 disposed in the exterior component 504 of the keyhole communication device 500 and circuitry 554 disposed in the interior component 502. In this arrangement, the antenna 552 is a preferably conventional short-range RF antenna. The circuitry 554 may include a radio portion 556, a control portion 558, a battery (not shown) and/or other portions as desired, wherein the radio portion 556 handles the transmission and reception of RF signals and the control portion 558 generally handles all other functions. Given an opening 506 of sufficient diameter (i.e., as described above, a diameter equal to at least one-quarter wavelength, and more preferably one full wavelength, of the radio waves used to communicate through the opening 506), the placement of the RF antenna 552 in the exterior component 504 of the keyhole communication device 500 permits the device 500 to communicate with nearby gateways 50 and/or other devices, such as neighboring keyhole communication devices 500, while still facilitating communication, using the same antenna 552, between the device 500 and communication devices internal to the container 102. This arrangement of the electronics assembly 550 is preferred for its simplicity and low cost, owing primarily to its single antenna/single radio portion design, but is generally unable to carry out wider-range communications such as cellular communication or the satellite communications illustrated in FIGS. 3 and 4.

Figure 9A:
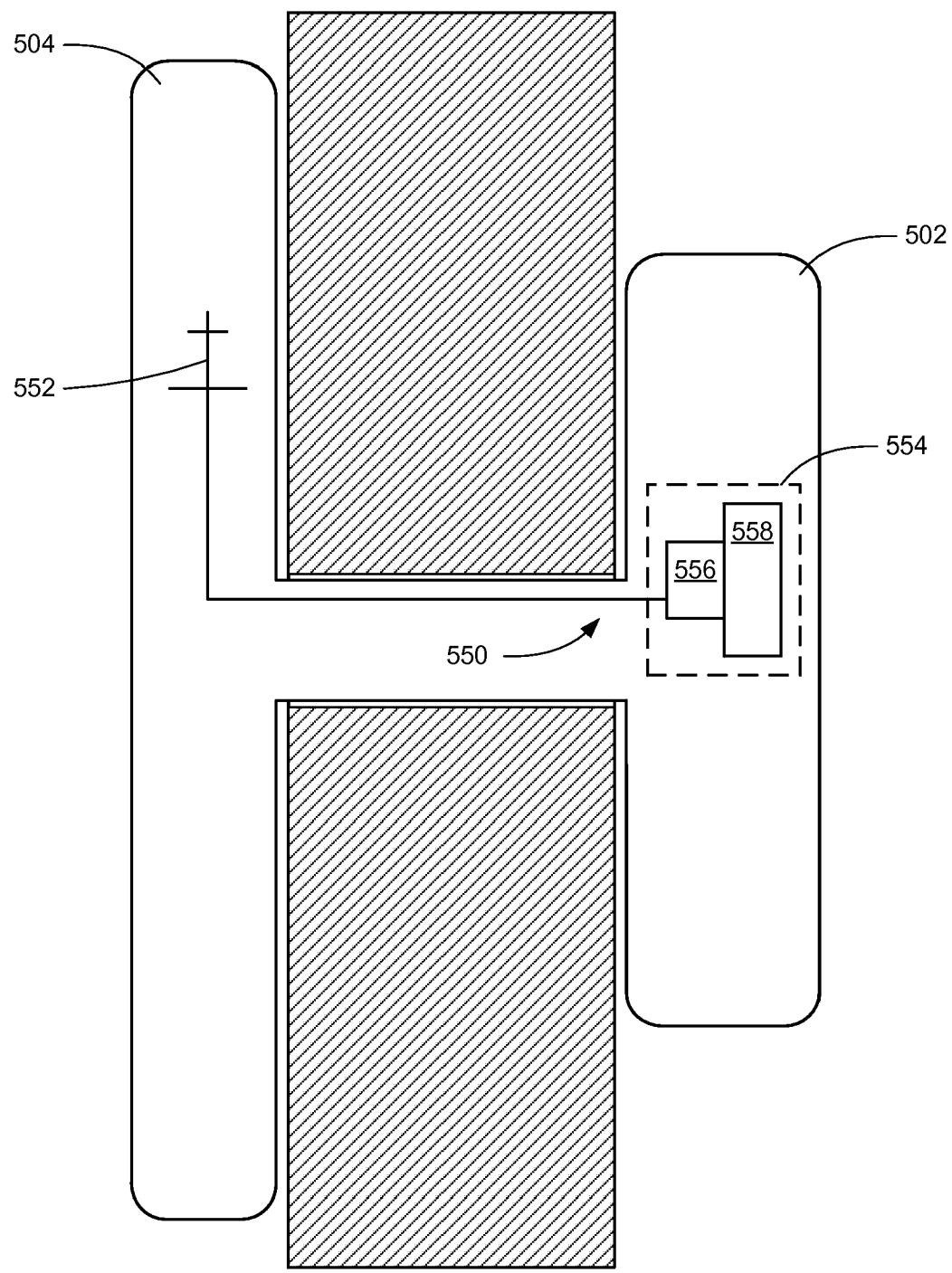
FIGS. 9A-9D are block diagrams of several alternative arrangements of the elements of the electronics assembly in a keyhole communication device, illustrating the relative disposition of the elements therein.
Figure 9B:
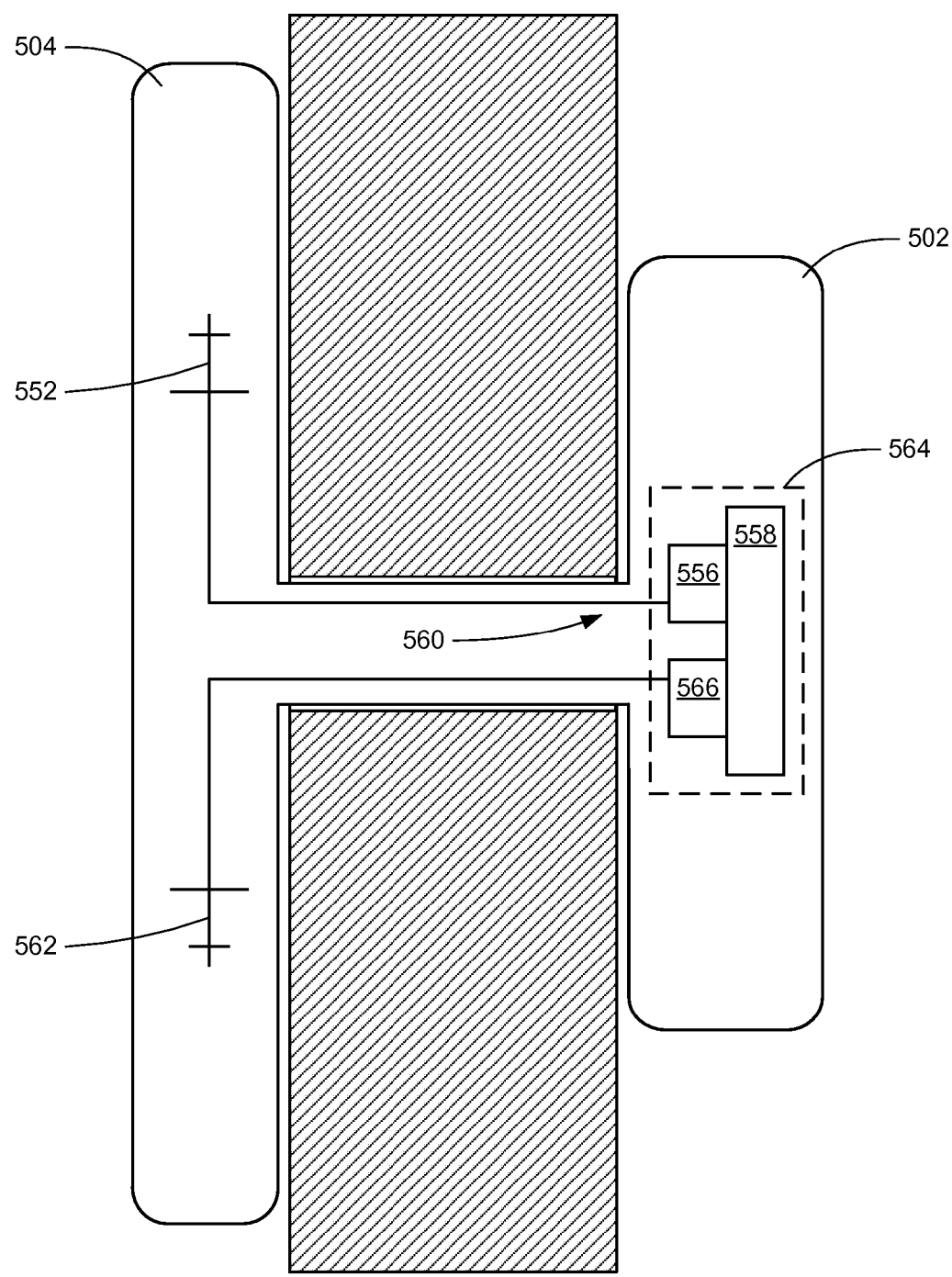

A second alternative electronics assembly 560, shown in FIG. 9B, includes a first antenna 552 disposed in the exterior component 504 of the keyhole communication device 500, at least a second antenna 562 that is also disposed in the exterior component 504 of the keyhole communication device 500, and circuitry 564 disposed in the interior component 502. In this arrangement, the first antenna 552 is a preferably conventional short-range RF antenna, while the second antenna 562 is a specialized antenna for longer-range communications, such as a satellite antenna or cellular telephone antenna. The circuitry 564 may include a radio portion 556, 566 for each antenna 552, 562, a control portion 568, a battery (not shown) and/or other portions as desired, wherein a first radio portion 556 handles the transmission and reception of short-range RF signals, a second radio portion 566 handles the transmission and reception of longer-range RF signals, and the control portion 558 generally handles all other functions. Given an opening 506 of sufficient diameter (i.e., as described above, a diameter equal to at least one-quarter wavelength, and more preferably one full wavelength, of the radio waves used to communicate through the opening 506), the placement of the RF antenna 552 in the exterior component 504 of the keyhole communication device 500 once again permits the device 500 to communicate with nearby gateways 50 and/or other devices, such as neighboring keyhole communication devices 500, while still facilitating communication, using the same antenna 552, between the device 500 and communication devices internal to the container 102. In addition, the second radio portion 566 and antenna 562 permit this arrangement of the electronics assembly 560 to carry out wider-range communications such as cellular communication or the satellite communications illustrated in FIGS. 3 and 4, thus providing the ability to track and/or monitor the container 102 and its contents when the container 102 is traveling or otherwise out of the range of one of the fixed-location gateways 50.

Figure 9C:
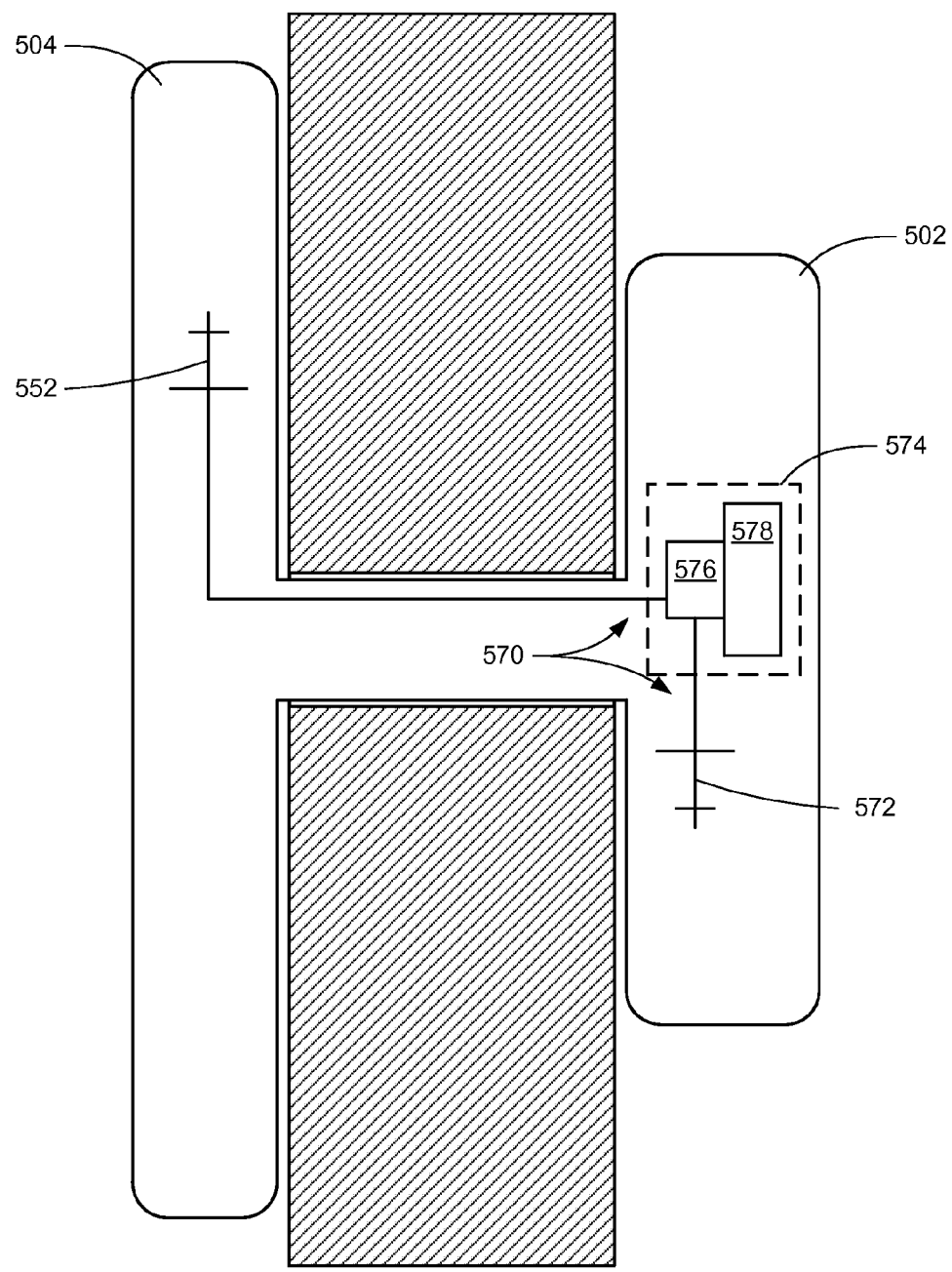

A third alternative electronics assembly 570, shown in FIG. 9C, includes a first antenna 552 disposed in the exterior component 504 of the keyhole communication device 500, a second antenna 572 disposed in the interior component 502 of the keyhole communication device 500, and circuitry 574 disposed in the interior component 502. In this arrangement, the first antenna 552 is a preferably conventional short-range RF antenna, while the second antenna 572 is also a short-range antenna intended specifically for wireless communications within the shipping container 102 as contemplated above. The circuitry 574 may include a radio portion 576 for the antennas 552, 572, a control portion 578, a battery (not shown) and/or other portions as desired, wherein the radio portion 576 handles the transmission and reception of short-range RF signals via either antenna 552, 572 and the control portion 578 generally handles all other functions. This arrangement of the electronics assembly 570 is preferred for its ability to communicate both externally and internally with separate antennas 552, 572, thus obviating, or at least reducing, the need for a wall opening 506 of minimum diameter, since there is little or no need for wireless transmissions to pass through the opening 506. Furthermore, in a first variation of this alternative assembly 570, the circuitry 574 may further include a second radio portion (not shown), wherein a first radio portion 576 handles the transmission and reception of RF signals via the first antenna 552 and the second radio portion handles the transmission and reception of RF signals via the first antenna 572. Still further, in a second variation of this alternative assembly 570, the long-range antenna 562 and radio portion 564 shown in FIG. 9B may be combined therewith.

In an additional variation applicable to one or more of the various alternative electronics assemblies 550, 560, 570 shown in FIGS. 9A-9C, the respective electronics assembly may further include, as contemplated hereinabove, a GPS receiver (not shown) for determining a geographic location of the shipping container 102, whereby data communicated to the server-based application 106 may include locational data of the shipping container 102 as determined by the GPS receiver. Such a keyhole communication device 500 preferably includes a patch antenna for the GPS receiver within the exterior component 504 and includes the GPS receiver within the interior component 502.

Figure 9D:
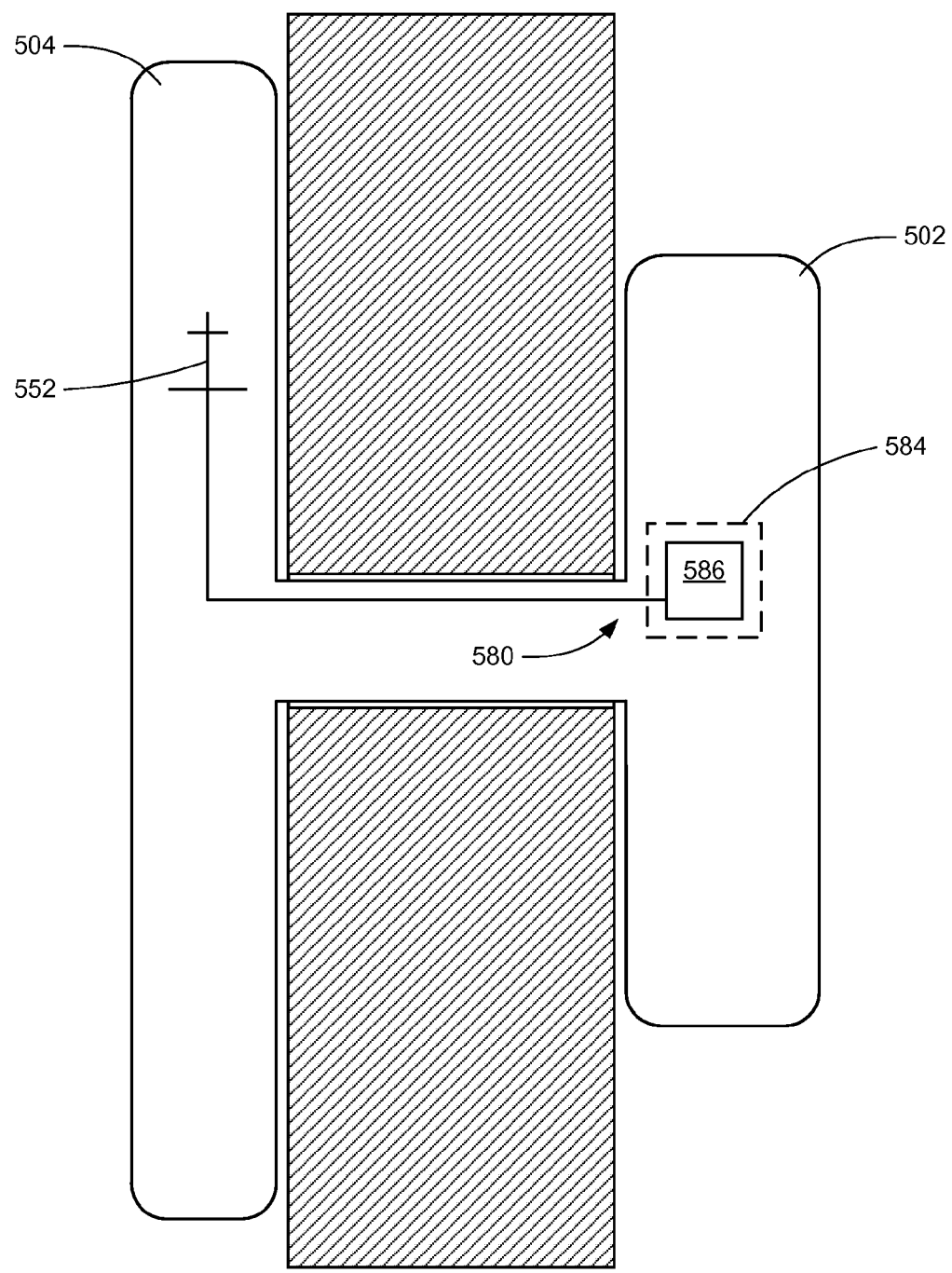

A fourth alternative electronics assembly 580, shown in FIG. 9D, includes an antenna 552 disposed in the exterior component 504 of the keyhole communication device 500 and circuitry 584 disposed in the interior component 502. In this arrangement, the antenna 552 is once again a preferably conventional short-range RF antenna. However, in this arrangement, the circuitry 584 may simply include a radio portion 586, a battery (not shown) and/or other portions as desired, wherein the radio portion 556 is merely a repeater that handles the reception and retransmission of RF signals. The repeater function may be used to amplify and retransmit signals received from devices inside the shipping container 102, nearby communication devices such other keyhole communication devices 500 on or in adjacent shipping containers 102, gateways 50, or any combination thereof. Given an opening 506 of sufficient diameter (i.e., as described above, a diameter equal to at least one-quarter wavelength, and more preferably one full wavelength, of the radio waves used to communicate through the opening 506), the placement of the RF antenna 552 in the exterior component 504 of the keyhole communication device 500 permits devices inside the container 102 to communicate, via the keyhole communication device 500, with nearby gateways 50 and/or other devices, such as neighboring keyhole communication devices 500. This arrangement of the electronics assembly 550 may be useful as being even simpler and cheaper than the assembly shown in FIG. 9A, but is limited in its inability to provide any function other than merely repeating (retransmitting) signals into and from the shipping container 102.

In order to reduce unnecessary power consumption by a keyhole communication device 500, each keyhole communication device 500 preferably utilizes the technology disclosed in International Patent Application Publication No. WO 03/098851 A1 for selective wake-up. This technology is sometimes referred to as "tag turn-on" technology, the electronics responsible for transmitting one or more appropriate RF signals to wake up an intended device is sometimes referred to as "tag turn-on" or "TTO," and the electronics in the intended device that is responsible for monitoring for the appropriate RF signal or signals and waking up the rest of the device is sometimes referred to as a "tag turn-on circuit" or "TTOC." In accordance with this feature, a keyhole communication device 500 preferably includes in the exterior component 504 thereof the TTOC, including both the electronics and the antenna thereof, for monitoring for the appropriate RF signal or signals and waking up the rest of the keyhole communication device 500. In fact, due to the sensitivity of the monitoring for the RF signal to wake up the rest of the keyhole communication device 500, significant physical separation of the antenna from the electronics of the TTOC is not recommended and, thus, the exterior component 504 of the keyhole communication device 500 preferably contains both the TTOC antenna and the electronics thereof.

It is furthermore contemplated that communication devices 134 located both interior and exterior to the shipping container 102 will likewise have the technology disclosed in International Patent Application Publication No. WO 03/098851 A1 for selective wake-up of the respective device 134 in response to an RF signal intended for that device 134. Accordingly, a keyhole communication device 500 equipped to communicate with such devices 134 preferably includes tag turn-on electronics including an antenna thereof. Furthermore, the TTO electronics and antenna may be contained within the interior component 502 if applied in an implementation that is "shipping container internal centric," or alternatively, the antenna, and preferably the TTO electronics as well, may be located in the exterior compartment 504 if communication devices 134 both interior and exterior to the shipping container 102 are to be awakened by the keyhole communication device 500.

Figure 10A:
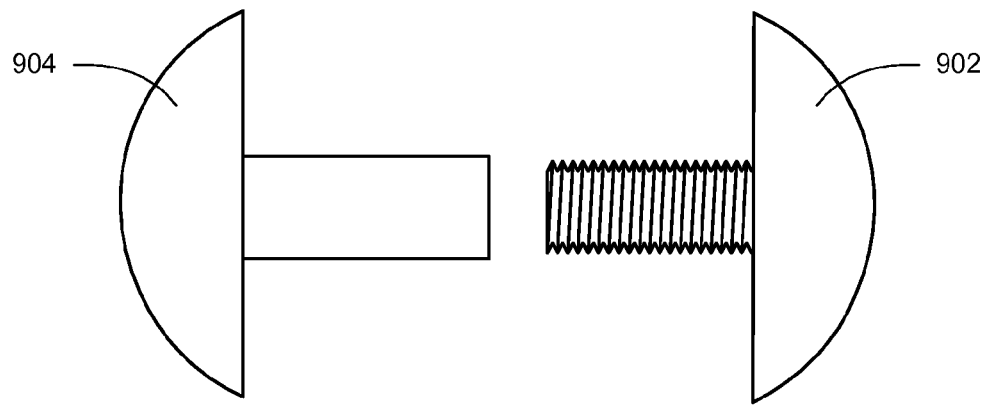
FIGS. 10A and 10B are side elevational views of additional keyhole communication devices for attaching to shipping containers in accordance with other preferred embodiments of the present invention.
Figure 10B:
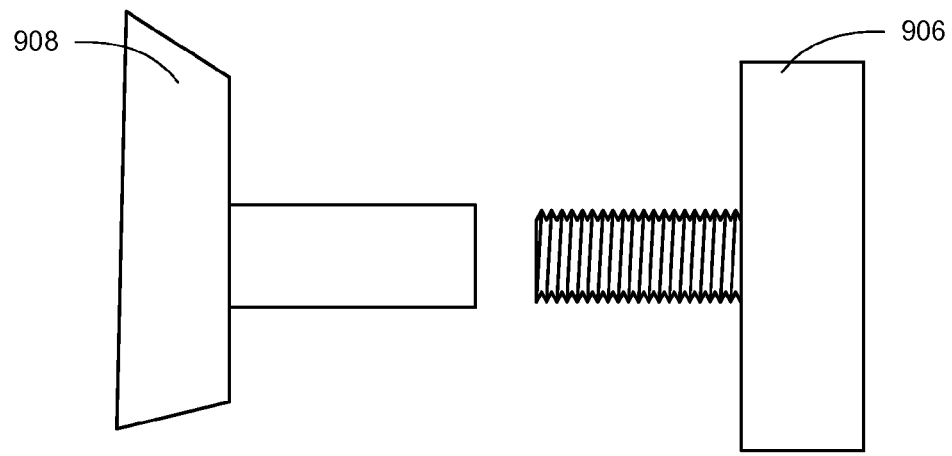

It will be apparent to the Ordinary Artisan that the configuration of the components 502, 504 may vary widely but should generally be designed so as to fit within or around any particular contours of the wall 508 of the shipping container 102. Indeed, walls 508 of conventional shipping containers 102 often have a corrugated shape, and the components 502, 504 should preferably have configurations that fit within or conform to such shape for a seamless fit therewith. Various different configurations are illustrated herein. In FIGS. 7-8, discussed above, each of the components 502, 504 has a cross-sectional configuration that is generally rectangular with rounded corners. Other exemplary configurations are illustrated in FIGS. 10A and 10B. FIG. 10A discloses a communication device 701, in which the internal and external components 702, 704 each have a cross-sectional configuration that is semicircular. FIG. 10B discloses yet another communication device 705, in which the internal and external components 706, 708 have differing cross-sectional configurations; in this regard, the internal component 706 has a cross-sectional configuration that is rectangular with square corners, while the external component 708 has a cross-sectional configuration that is trapezoidal, also with square corners. It will be apparent that any suitable configuration may be used for both the internal and external components of a keyhole communication device without departing from the scope of the present invention.

Many benefits are provided by the present invention. Indeed, one or more benefits provided by various embodiments of the present invention include, inter alia: the protection of electronics inside the shipping container 102; the provision of good communications coverage beyond the shipping container 102 with the antennae being disposed outside of the shipping container 102; the provision of good communications coverage within the shipping container through the opening in the shipping container wall 508; the reduction in power consumption due to the lower output power required to communicate between the interior and exterior of the shipping container 102; the ability to position sensors, inside and outside of the container with minimal or no wired connections; and the avoidance of single failure points.

Based on the foregoing information, it is readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof. Although specific terms are employed herein, they are used in a generic and descriptive sense only and not for the purpose of limitation.

What is claimed is:

1. A method for monitoring contents of a shipping container, comprising the steps of:
   (a) wirelessly communicating information relating to interior contents of the shipping container, to a communication device attached to the shipping container, from one or more wireless devices within the interior of the shipping container; and
   (b) wirelessly communicating information relating to interior contents of the shipping container, from the communication device attached to the shipping container, to a network external to the shipping container;
   (c) wherein the communication device attached to the shipping container includes electronics and at least one antenna, and further includes first and second housing components located on opposite sides of a wall of the shipping container, with the first housing component defining a first hollow interior and residing substantially exterior to the shipping container, and with the second housing component defining a second hollow interior and residing substantially within the interior of the shipping container, the first hollow interior being contiguous with the second hollow interior.

2. The method of claim 1, wherein the first housing component of the communication device includes an antenna with which said steps (a) and (b) are performed.

3. The method of claim 2, wherein the second housing component includes circuitry for controlling wireless communications by the antenna.

4. The method of claim 3, wherein the circuitry is part of an electronics assembly.

5. The method of claim 1, wherein the first housing component of the communication device includes a first antenna in connection with which said step (a) is performed and a second antenna in connection with which said step (b) is performed.

6. The method of claim 5, wherein the second housing component includes a first circuitry for controlling wireless communications via the first antenna and second circuitry for controlling wireless communications via the second antenna.

7. The method of claim 5, wherein the second housing component comprises circuitry for controlling wireless communications via the first antenna and via the second antenna.

8. The method of claim 1, wherein the first housing component of the communication device includes a first antenna by which said step (b) is performed and wherein the second housing component comprises a second antenna by which said step (a) is performed.

9. The method of claim 8, wherein the second housing component comprises first circuitry for controlling wireless communications via the first antenna and second circuitry for controlling wireless communications via the second antenna.

10. The communication device of claim 8, wherein the communication device is adapted for satellite and 2.4 GHz communications.

11. The communication device of claim 8, wherein the electronics assembly is adapted for cellular and 2.4 GHz communications.

12. The method of claim 8, wherein the second housing component comprises circuitry for controlling wireless communications by the first antenna and by the second antenna.

13. The method of claim 1, wherein the first housing component and the second housing component are secured together through an opening in the wall of the shipping container.

14. The method of claim 1, wherein at least one of the communication devices within the shipping container is associated with a content of the shipping container.

15. The method of claim 1, further comprising the step of sending a message from the external network to the communication device attached to the shipping container that results in the communication device attached to the shipping container sending a message to a wireless device within the interior of the shipping container.

16. The method of claim 15, wherein the message that is sent to the wireless device within the interior of the shipping container results in the wireless device sending a message to the communication device attached to the shipping container, and further comprising the step of sending, in response thereto, a message to the external network from the communication device attached to the shipping container.

17. The method of claim 1, wherein one of the wireless devices within the interior of the shipping container comprises a sensor.

18. The method of claim 17, wherein the sensor comprises a temperature sensor, a motion sensor, a humidity sensor, a radiation sensor, a video camera, a still camera, an electronic seal sensor, or a microphone.

19. A method for tracking a shipping container, comprising the steps of:
 (a) determining location information of the shipping container and interior contents thereof using a GPS receiver and wirelessly communicating, by a communication device attached to the shipping container, with a network external to the shipping container, the wireless communications including information relating to the location of the shipping container and interior contents;
 (b) wherein the communication device comprises first and second housing components located on opposite sides of a wall of the shipping container, with the first housing component defining a first hollow interior and residing substantially exterior to the shipping container, and with the second housing component defining a second hollow interior and residing substantially within the interior of the shipping container, the first hollow interior being contiguous with the second hollow interior;
 (c) wherein the first housing component includes a first antenna and the second housing component includes the GPS receiver disposed in electronic communication with the first antenna; and
 (d) wherein the first housing component includes a second antenna and the second housing component includes circuitry disposed in electronic communication with the second antenna for controlling wireless communications via the second antenna with the network external to the shipping container.

20. The method of claim 1, wherein the first housing component and the second housing component are secured together through an opening in the wall of the shipping container to form an integrated housing structure.

* * * * *